United States Patent
Genner

(10) Patent No.: US 12,353,530 B1
(45) Date of Patent: Jul. 8, 2025

(54) SHAPE OVERLAY FOR PROOF OF LIVENESS

(71) Applicant: T STAMP INC., Atlanta, GA (US)

(72) Inventor: Gareth Neville Genner, Atlanta, GA (US)

(73) Assignee: T Stamp Inc., Atlanta, GA (US)

( * ) Notice: Subject to any disclaimer, the term of this patent is extended or adjusted under 35 U.S.C. 154(b) by 329 days.

(21) Appl. No.: 18/063,372

(22) Filed: Dec. 8, 2022

Related U.S. Application Data

(60) Provisional application No. 63/287,276, filed on Dec. 8, 2021.

(51) Int. Cl.
| | |
|---|---|
| G06F 21/32 | (2013.01) |
| G06V 10/40 | (2022.01) |
| G06V 40/16 | (2022.01) |
| G06V 40/40 | (2022.01) |

(52) U.S. Cl.
CPC .............. G06F 21/32 (2013.01); G06V 10/40 (2022.01); G06V 40/172 (2022.01); G06V 40/45 (2022.01); G06F 2221/2103 (2013.01)

(58) Field of Classification Search
CPC ........... G06F 21/32; G06F 2221/2103; G06V 40/172; G06V 10/40; G06V 40/45; G06V 40/16
See application file for complete search history.

(56) References Cited

U.S. PATENT DOCUMENTS

| | | |
|---|---|---|
| 6,836,554 B1 | 12/2004 | Bolle et al. |
| 7,120,607 B2 | 10/2006 | Bolle et al. |
| 7,412,081 B2 | 8/2008 | Doi |
| 7,773,784 B2 | 8/2010 | Boult |
| 7,822,631 B1 | 10/2010 | Vander Mey et al. |
| 8,010,460 B2 | 8/2011 | Work et al. |
| 8,249,314 B2 | 8/2012 | Bolle et al. |

(Continued)

FOREIGN PATENT DOCUMENTS

| | | | | |
|---|---|---|---|---|
| AU | 2014265558 A1 * | 11/2015 | ............ | G06F 21/32 |
| CN | 103930921 A | 7/2014 | | |

(Continued)

OTHER PUBLICATIONS

Wonjun Kim, Face Liveness Detection From a Single Image via Diffusion Speed Model, IEEE Transactions on Image Processing, vol. 24, No. 8, Apr. 13, 2015, pp. 2456 to 2465.

(Continued)

*Primary Examiner* — Jayesh M Jhaveri
(74) *Attorney, Agent, or Firm* — Bradley Arant Boult Cummings LLP; Daniel E. Sineway, Esq.

(57) ABSTRACT

A method can include capturing biometric data of a subject via at least one computing device. The method can include rendering, on a display of the at least one computing device, at least one shape overlay. The method can include, during capture of the biometric data, receiving, via the at least one computing device, a tracing input of the at least one shape overlay. The method can include receiving the biometric data the at least one computing device. The method can include comparing the tracing input and the at least one shape overlay. The method can include, based on the comparison, determining that the biometric data satisfies at least one liveness threshold.

17 Claims, 11 Drawing Sheets

(56) References Cited

U.S. PATENT DOCUMENTS

| | | |
|---|---|---|
| 8,312,291 B2 | 11/2012 | Golic et al. |
| 8,316,086 B2 | 11/2012 | Ufford et al. |
| 8,457,367 B1 | 6/2013 | Sipe et al. |
| 8,510,797 B2 | 8/2013 | Kasturi |
| 8,542,879 B1 | 9/2013 | Nechyba et al. |
| 8,675,926 B2 | 3/2014 | Zhang et al. |
| 8,724,856 B1 | 5/2014 | King |
| 8,965,066 B1 | 2/2015 | Derakhshani et al. |
| 9,070,088 B1 | 6/2015 | Baveja et al. |
| 9,147,117 B1 | 9/2015 | Madhu et al. |
| 9,173,101 B1 | 10/2015 | Angelov et al. |
| 9,262,725 B2 | 2/2016 | Butte et al. |
| 9,300,676 B2 | 3/2016 | Madhu et al. |
| 9,477,828 B2 | 10/2016 | Irie |
| 9,495,588 B2 | 11/2016 | Derakhshani et al. |
| 9,521,606 B1 | 12/2016 | Costa et al. |
| 9,652,663 B2 | 5/2017 | Lau et al. |
| 9,679,212 B2 | 6/2017 | Kim et al. |
| 9,721,147 B1 | 8/2017 | Kapczynski |
| 9,838,388 B2 | 12/2017 | Mather et al. |
| 9,866,393 B1 | 1/2018 | Rush et al. |
| 10,019,561 B1 | 7/2018 | Shelton et al. |
| 10,049,287 B2 | 8/2018 | Holz et al. |
| 10,210,388 B2 | 2/2019 | Derakhshani et al. |
| 10,225,255 B1 | 3/2019 | Jampani et al. |
| 10,275,684 B2 | 4/2019 | Han et al. |
| 10,320,569 B1 | 6/2019 | Wentz et al. |
| 10,430,638 B2 | 10/2019 | Russo |
| 10,594,688 B2 | 3/2020 | Yang et al. |
| 10,628,700 B2 | 4/2020 | Puri et al. |
| 10,635,894 B1 | 4/2020 | Genner |
| 10,650,226 B2 | 5/2020 | Chu et al. |
| 10,733,424 B2 | 8/2020 | Son et al. |
| 10,735,205 B1 | 8/2020 | Wentz et al. |
| 10,796,178 B2 | 10/2020 | Fan et al. |
| 10,810,423 B2 | 10/2020 | Thavalengal |
| 11,080,516 B1 | 8/2021 | Joshi et al. |
| 11,080,517 B2 | 8/2021 | Wu et al. |
| 11,093,771 B1 | 8/2021 | Genner |
| 11,095,631 B1 | 8/2021 | Genner |
| 11,151,468 B1 | 10/2021 | Chen et al. |
| 2004/0019570 A1 | 1/2004 | Bolle et al. |
| 2004/0096085 A1 | 5/2004 | Matsumoto et al. |
| 2004/0186906 A1 | 9/2004 | Torrant et al. |
| 2005/0235148 A1 | 10/2005 | Scheidt et al. |
| 2006/0015358 A1 | 1/2006 | Chua |
| 2006/0042483 A1 | 3/2006 | Work et al. |
| 2006/0114520 A1 | 6/2006 | Enomoto et al. |
| 2006/0212931 A1 | 9/2006 | Shull et al. |
| 2007/0174633 A1 | 7/2007 | Draper et al. |
| 2008/0310727 A1 | 12/2008 | Wu et al. |
| 2008/0313714 A1 | 12/2008 | Fetterman et al. |
| 2009/0022374 A1 | 1/2009 | Boult |
| 2009/0080717 A1 | 3/2009 | Dias |
| 2009/0210722 A1 | 8/2009 | Russo |
| 2009/0271634 A1 | 10/2009 | Boult et al. |
| 2009/0310830 A1 | 12/2009 | Bolle et al. |
| 2009/0327054 A1 | 12/2009 | Yao et al. |
| 2010/0017618 A1 | 1/2010 | Golic et al. |
| 2010/0194919 A1 | 8/2010 | Ishii et al. |
| 2010/0250676 A1 | 9/2010 | Ufford et al. |
| 2011/0099277 A1 | 4/2011 | Yao et al. |
| 2011/0131643 A1 | 6/2011 | Lawrence et al. |
| 2011/0137789 A1 | 6/2011 | Kortina et al. |
| 2011/0246766 A1 | 10/2011 | Orsini et al. |
| 2011/0285748 A1 | 11/2011 | Slatter et al. |
| 2012/0011066 A1 | 1/2012 | Telle et al. |
| 2012/0014507 A1 | 1/2012 | Wu et al. |
| 2012/0072384 A1 | 3/2012 | Schreiner et al. |
| 2012/0102332 A1 | 4/2012 | Mullin |
| 2012/0124651 A1 | 5/2012 | Ganesan et al. |
| 2012/0130863 A1 | 5/2012 | Tedjamulia et al. |
| 2012/0284786 A1 | 11/2012 | Somani et al. |
| 2012/0331567 A1 | 12/2012 | Shelton |
| 2013/0004033 A1 | 1/2013 | Trugenberger |
| 2013/0086641 A1 | 4/2013 | Mehr et al. |
| 2013/0104202 A1 | 4/2013 | Yin et al. |
| 2013/0124644 A1 | 5/2013 | Hunt et al. |
| 2013/0191898 A1 | 7/2013 | Kraft |
| 2013/0219479 A1 | 8/2013 | DeSoto et al. |
| 2013/0259228 A1 | 10/2013 | Ren et al. |
| 2013/0262873 A1 | 10/2013 | Read et al. |
| 2014/0013422 A1 | 1/2014 | Janus et al. |
| 2014/0020073 A1 | 1/2014 | Ronda et al. |
| 2014/0037074 A1 | 2/2014 | Bravo et al. |
| 2014/0037156 A1 | 2/2014 | Cavallini |
| 2014/0059660 A1 | 2/2014 | Marra et al. |
| 2014/0071131 A1 | 3/2014 | Kitago |
| 2014/0075513 A1 | 3/2014 | Trammel et al. |
| 2014/0090039 A1 | 3/2014 | Bhow |
| 2014/0101434 A1 | 4/2014 | Senthurpandi et al. |
| 2014/0129493 A1 | 5/2014 | Leopold |
| 2014/0164218 A1 | 6/2014 | Stewart |
| 2014/0230023 A1 | 8/2014 | Parks |
| 2014/0247985 A1 | 9/2014 | Park |
| 2014/0253707 A1 | 9/2014 | Gangadhar |
| 2014/0258305 A1 | 9/2014 | Kapadia et al. |
| 2014/0270404 A1 | 9/2014 | Hanna et al. |
| 2014/0273978 A1 | 9/2014 | Van Snellenberg |
| 2014/0279556 A1 | 9/2014 | Priebatsch et al. |
| 2014/0289833 A1 | 9/2014 | Briceno et al. |
| 2014/0330732 A1 | 11/2014 | Grignon |
| 2014/0333415 A1 | 11/2014 | Kursun |
| 2014/0337948 A1 | 11/2014 | Hoyos |
| 2015/0046327 A1 | 2/2015 | Taupitz |
| 2015/0059003 A1 | 2/2015 | Bouse |
| 2015/0078630 A1 | 3/2015 | Derakhshani et al. |
| 2015/0121456 A1 | 4/2015 | Milman et al. |
| 2015/0154436 A1 | 6/2015 | Shi et al. |
| 2015/0156031 A1 | 6/2015 | Fadell et al. |
| 2015/0180857 A1 | 6/2015 | Schulman et al. |
| 2015/0186721 A1 | 7/2015 | Derakhshani et al. |
| 2015/0205800 A1 | 7/2015 | Work et al. |
| 2015/0227890 A1 | 8/2015 | Bednarek et al. |
| 2015/0261999 A1 | 9/2015 | Thiebot et al. |
| 2015/0269394 A1 | 9/2015 | Bringer et al. |
| 2015/0332169 A1 | 11/2015 | Bivens et al. |
| 2016/0019614 A1 | 1/2016 | Dziuk |
| 2016/0034708 A1 | 2/2016 | Shim et al. |
| 2016/0037156 A1 | 2/2016 | Lee |
| 2016/0048837 A1 | 2/2016 | Jin et al. |
| 2016/0050199 A1 | 2/2016 | Ganesan |
| 2016/0070704 A1 | 3/2016 | Yu |
| 2016/0085958 A1 | 3/2016 | Kang |
| 2016/0088023 A1 | 3/2016 | Handa et al. |
| 2016/0132670 A1* | 5/2016 | Salama ............... G06V 40/172 |
| | | 726/19 |
| 2016/0132901 A1 | 5/2016 | Davar et al. |
| 2016/0173605 A1 | 6/2016 | Iasi et al. |
| 2016/0191513 A1 | 6/2016 | Tomlinson et al. |
| 2016/0224853 A1 | 8/2016 | Xiong |
| 2016/0269178 A1 | 9/2016 | Yang et al. |
| 2016/0277424 A1 | 9/2016 | Mawji et al. |
| 2016/0379182 A1 | 12/2016 | Sheng et al. |
| 2017/0006008 A1 | 1/2017 | Moran et al. |
| 2017/0019400 A1 | 1/2017 | Drolshagen et al. |
| 2017/0032485 A1 | 2/2017 | Vemury |
| 2017/0034183 A1 | 2/2017 | Enqvist et al. |
| 2017/0061138 A1 | 3/2017 | Lambert |
| 2017/0063852 A1* | 3/2017 | Azar ..................... G06V 40/70 |
| 2017/0082740 A1 | 3/2017 | Kitchens, II et al. |
| 2017/0134366 A1 | 5/2017 | Genner et al. |
| 2017/0140204 A1 | 5/2017 | Derakhshani et al. |
| 2017/0210525 A1 | 7/2017 | Mayer et al. |
| 2017/0250796 A1 | 8/2017 | Samid |
| 2017/0256056 A1 | 9/2017 | Jain et al. |
| 2017/0264599 A1 | 9/2017 | O'Regan et al. |
| 2017/0279795 A1 | 9/2017 | Redberg |
| 2017/0286788 A1 | 10/2017 | Fan et al. |
| 2017/0331818 A1 | 11/2017 | Kader et al. |
| 2017/0346851 A1 | 11/2017 | Drake |
| 2017/0372055 A1 | 12/2017 | Robinson et al. |
| 2018/0005019 A1 | 1/2018 | Chattopadhyay et al. |
| 2018/0018651 A1 | 1/2018 | Nelson et al. |

(56) References Cited

U.S. PATENT DOCUMENTS

| | | |
|---|---|---|
| 2018/0034852 A1 | 2/2018 | Goldenberg |
| 2018/0048472 A1 | 2/2018 | Pirrwitz et al. |
| 2018/0060648 A1 | 3/2018 | Yoo et al. |
| 2018/0068101 A1* | 3/2018 | Kasilya Sudarsan ................. H04W 12/065 |
| 2018/0069703 A1 | 3/2018 | Chakraborty et al. |
| 2018/0077571 A1 | 3/2018 | Mannopantar et al. |
| 2018/0082455 A1 | 3/2018 | Yamaji et al. |
| 2018/0097806 A1 | 4/2018 | Blinn |
| 2018/0101742 A1 | 4/2018 | Burge et al. |
| 2018/0167388 A1 | 6/2018 | Farrell et al. |
| 2018/0191501 A1 | 7/2018 | Lindemann |
| 2018/0205557 A1 | 7/2018 | Sun |
| 2018/0211092 A9 | 7/2018 | Derakhshani et al. |
| 2018/0248699 A1 | 8/2018 | Andrade |
| 2018/0302406 A1 | 10/2018 | Burckhardt et al. |
| 2018/0307895 A1 | 10/2018 | Chu et al. |
| 2019/0043148 A1 | 2/2019 | Vemury |
| 2019/0044943 A1* | 2/2019 | Kim ................. H04W 12/30 |
| 2019/0080065 A1* | 3/2019 | Sheik-Nainar ......... G06V 40/40 |
| 2019/0236259 A1* | 8/2019 | Remillet ............... G06F 3/0482 |
| 2019/0311102 A1 | 10/2019 | Tussy |
| 2019/0312734 A1 | 10/2019 | Wentz et al. |
| 2019/0334884 A1 | 10/2019 | Ross et al. |
| 2019/0379541 A1 | 12/2019 | Schwach et al. |
| 2020/0036707 A1 | 1/2020 | Callahan et al. |
| 2020/0045044 A1* | 2/2020 | Turgeman ........... G06F 3/03543 |
| 2020/0084191 A1 | 3/2020 | Nicholls |
| 2020/0145219 A1 | 5/2020 | Sebastian et al. |
| 2020/0153624 A1 | 5/2020 | Wentz et al. |
| 2020/0186350 A1 | 6/2020 | Wentz et al. |
| 2020/0201679 A1 | 6/2020 | Wentz |
| 2020/0257889 A1 | 8/2020 | Merkel et al. |
| 2020/0293640 A1 | 9/2020 | Joshi et al. |
| 2020/0351089 A1 | 11/2020 | Wentz |
| 2020/0351098 A1 | 11/2020 | Wentz |
| 2020/0351657 A1 | 11/2020 | Wentz |
| 2020/0356085 A1 | 11/2020 | Wentz et al. |
| 2020/0404019 A1 | 12/2020 | Drake |
| 2021/0019519 A1 | 1/2021 | Martin et al. |
| 2021/0027080 A1 | 1/2021 | Storm et al. |
| 2021/0073518 A1 | 3/2021 | Kumar et al. |
| 2022/0191195 A1* | 6/2022 | Moros Ortiz ........... G06F 21/40 |

FOREIGN PATENT DOCUMENTS

| | | |
|---|---|---|
| EP | 3065366 A1 | 9/2016 |
| WO | 2008010773 A1 | 1/2008 |
| WO | 2019034589 A1 | 2/2019 |

OTHER PUBLICATIONS

Xinting Gao, Single-View Recaptured Image Detection Based on Physics-Based Features, 2010 IEEE International Conference on Multimedia and Expo, Jul. 19, 2010, pp. 1469 to 1474.

Di Wen, Face Spoof Detection with Image Distortion Analysis, IEEE Transactions on Information Forensics and Security, vol. 10, No. 4, Apr. 2015, pp. 746 to 761.

Rohit Kumar Pandey, Deep Secure Encoding for Face Template Protection, Conference on Computer Vision and Pattern Recognition Workshops, Jun. 26, 2016, pp. 77 to 83.

Rathgeb et al., "Unlinkable Improved Multi-biometric Iris Fuzzy Vault", EURASIP Journal on Information Security, 2016, 2016:26.

* cited by examiner

SHAPE OVERLAY FOR PROOF OF LIVENESS

CROSS-REFERENCE TO RELATED APPLICATIONS

This application claims the benefit of, and priority to, U.S. Provisional Patent Application No. 63/287,276, filed Dec. 8, 2021, entitled "SHAPE OVERLAY FOR PROOF OF LIVENESS," the disclosure of which is incorporated herein by reference in its entirety.

TECHNICAL FIELD

The present systems and methods relate generally to digital biometric security and, more particularly, to verification of subject liveness in digital media to prevent spoofing.

BACKGROUND

Establishing that a particular item of digital media (e.g., photograph, video, etc.) used for biometric security identification is an unadulterated reproduction of a live human face and not a reproduction of a photograph, a three-dimensional ("3D") representation of a human face, a digital rendering, or an adapted image of a face is an important part of the biometric digital security process that is often referred to as "proof of liveness." Existing methodologies for establishing proof of liveness typically rely upon requiring the subject to perform facial expressions or gestures (e.g., winking, waving, etc.). Such methodologies are generally capable of trickery or deception, which is often referred to as "spoofing," by various known and published techniques. For example, synthetic media "deepfakes" may be generated and used to spoof facial expressions and gestures, such as winking, waving, or smiling. In addition, certain facial expressions and gestures may not be feasible due to reluctance or inability on the part of the subject. For example, a subject may be reluctant to perform a wink or wave their hands in public where such actions can be seen as awkward or embarrassing. As another example, a subject may be physically unable to perform a required facial expression or gesture.

Therefore, there is a long-felt but unresolved need for a system or method that permits passive-subject liveness verification in digital media to prevent spoofing and does not require physical movement by the subject.

BRIEF SUMMARY OF THE DISCLOSURE

Briefly described, and according to one embodiment, aspects of the present disclosure generally relate to systems, methods, and apparatuses for biometric-based authentication.

In various embodiments, the disclosed system enhances the security of biometric authentication processes by determining that biometric inputs correspond to a live capture of a living subject. In one or more embodiments, the disclosed system determines proof of liveness prior to, during, or following capture of a subject's biometric via a computing device. In at least one embodiment, the disclosed system renders a shape overlay on a display of the subject's computing device. The shape overlay can be any shape or shape combination. The shape overlay can be closed or open. The disclosed system can cause the computing device to render multiple shape overlays simultaneously or sequentially. The disclosed system can require a subject to submit tracing inputs for all rendered overlays or for a subset of rendered overlays (e.g., which the disclosed system may identify via an additional rendered instruction, such as "Trace the square," "Trace the second largest circle," "Trace only the four-sided shapes," etc.).

The disclosed system can prompt the subject to trace the shape overlay prior to, during, or immediately following the capture of the subject's biometric (e.g., the activation of a camera, video recorder, and/or audio recorder). The disclosed system can receive the capture of the subject's biometrics and one or more inputs for tracing the shape overlay. The disclosed system can analyze the tracing input and determine that the tracing input is sufficiently similar to the shape overlay. Based on one or more comparisons between the tracing input and the shape overlay, the disclosed system can determine that the biometric capture corresponds to a live capture of a living subject. In various embodiments, following the positive determination of liveness, the disclosed system performs one or more identification and/or verification processes to identify or verify the subject's identity based on the biometric capture. The disclosed system can perform additional appropriate actions based on the result of identification or verification processes, such as permitting or denying access to a physical and/or digital environment, generating links between user accounts or other data, or transmitting alerts to external systems.

According to a first aspect, a method, comprising: A) capturing biometric data of a subject via at least one computing device; B) rendering, on a display of the at least one computing device, at least one shape overlay; C) during capture of the biometric data, receiving, via the at least one computing device, a tracing input corresponding to the at least one shape overlay; D) receiving the biometric data from the at least one computing device; E) comparing the tracing input and the at least one shape overlay; and F) based on the comparison, determining that the biometric data satisfies at least one liveness threshold.

According to a further aspect, the method of the first aspect or any other aspect, further comprising generating at least one fixed-size representation of the subject based on the biometric data.

According to a further aspect, the method of the first aspect or any other aspect, wherein the biometric data comprises a facial scan of the subject.

According to a further aspect, the method of the first aspect or any other aspect, wherein the facial scan comprises a video.

According to a further aspect, the method of the first aspect or any other aspect, wherein the at least one shape overlay comprises at least two shape overlays.

According to a further aspect, the method of the first aspect or any other aspect, wherein: A) a first shape overlay of the at least two shape overlays is a first shape; and B) a second shape overlay of the at least two shape overlays is a second shape different from the first shape.

According to a further aspect, the method of the first aspect or any other aspect, further comprising: A) rendering, on the display, an instruction to: 1) trace a first shape overlay of the at least two shape overlays in a first color; and 2) trace a second shape overlay of the at least two shape overlays in a second color different from the first color, wherein the tracing input comprises a first tracing input for the first shape overlay and a second tracing input for the second shape overlay; and B) determining that the first tracing input is associated with the first color and the second tracing input is associated with the second color.

According to a further aspect, the method of the first aspect or any other aspect, further comprising rendering, on the display, a plurality of color selectors comprising at least the first color and the second color.

According to a further aspect, the method of the first aspect or any other aspect, wherein the at least one shape overlay comprises a closed shape.

According to a further aspect, the method of the first aspect or any other aspect, wherein the at least one shape overlay comprises an open shape.

According to a second aspect, a system, comprising: A) a server having a processor configured to: 1) receive captured biometric data of a subject from at least one computing device; 2) output instructions for rendering, on a display of the at least one computing device, at least one shape overlay; 3) receive biometric data and tracing input data from the at least one computing device, the tracing input data being indicative of a tracing input received by the at least one computing device simultaneously with the at least one computing device capturing the biometric data; 4) compare the tracing input data and the at least one shape overlay; and 5) based on the comparison, determine that the biometric data satisfies at least one liveness threshold.

According to a further aspect, the system of the second aspect or any other aspect, further comprising at least one data store configured to store a plurality of shape overlays, wherein the processor is configured to retrieve the at least one shape overlay from the plurality of shape overlays.

According to a further aspect, the system of the second aspect or any other aspect, wherein the processor is configured to pseudorandomly generate the at least one shape overlay based on a seed value.

According to a further aspect, the system of the second aspect or any other aspect, further comprising at least one data store configured to store at least one policy corresponding to the at least one computing device, wherein the processor is configured to render the at least one shape overlay on the display based on the at least one policy.

According to a further aspect, the system of the second aspect or any other aspect, wherein the at least one policy comprises causes the processor to render the at least one shape overlay within a particular region of the display.

According to a third aspect, a non-transitory, computer-readable medium comprising instructions that, when executed by a computer, cause the computer to: A) capture biometric data of a subject via at least one secondary computing device; B) render, on a display of the at least one secondary computing device, at least one shape overlay; C) during capture of the biometric data, receive, via the at least one secondary computing device, a tracing input of the at least one shape overlay; D) receive the biometric data the at least one secondary computing device; E) compare the tracing input and the at least one shape overlay; and F) based on the comparison, determine that the biometric data satisfies at least one liveness threshold.

According to a further aspect, the non-transitory, computer-readable medium of the third aspect or any other aspect, wherein: A) the instructions, when executed by the computer, further cause the computer to render a particular shape on the display; B) the tracing input comprises an erasure of a portion of the particular shape and a non-erased portion of the particular shape; and C) the instructions, when executed by the computer, cause the computer to compare the tracing input and the at least one shape overlay by comparing the non-erased portion of the particular shape to the at least one shape overlay.

According to a further aspect, the non-transitory, computer-readable medium of the third aspect or any other aspect, wherein the instructions, when executed by the computer, further cause the computer to: A) generate at least one fixed-size representation (FXR) of the subject based on the biometric data; B) compare the at least one FXR to at least one secondary FXR associated with a second subject; and C) based on the comparison of the at least one FXR to the at least one secondary FXR, positively verify that the subject and the second subject share an identity.

According to a further aspect, the non-transitory, computer-readable medium of the third aspect or any other aspect, wherein the instructions, when executed by the computer, further cause the computer to, authorize access for the at least one secondary computing device access to a particular digital environment in response to positively verifying that the subject and the second subject share the identity.

According to a further aspect, the non-transitory, computer-readable medium of the third aspect or any other aspect, wherein the instructions, when executed by the computer, further cause the computer to, in response to positively verifying that the subject and the second subject share the identity: A) decrypt at least one encrypted communication; and B) render the at least one encrypted communication on the display of the at least one secondary computing device.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE FIGURES

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
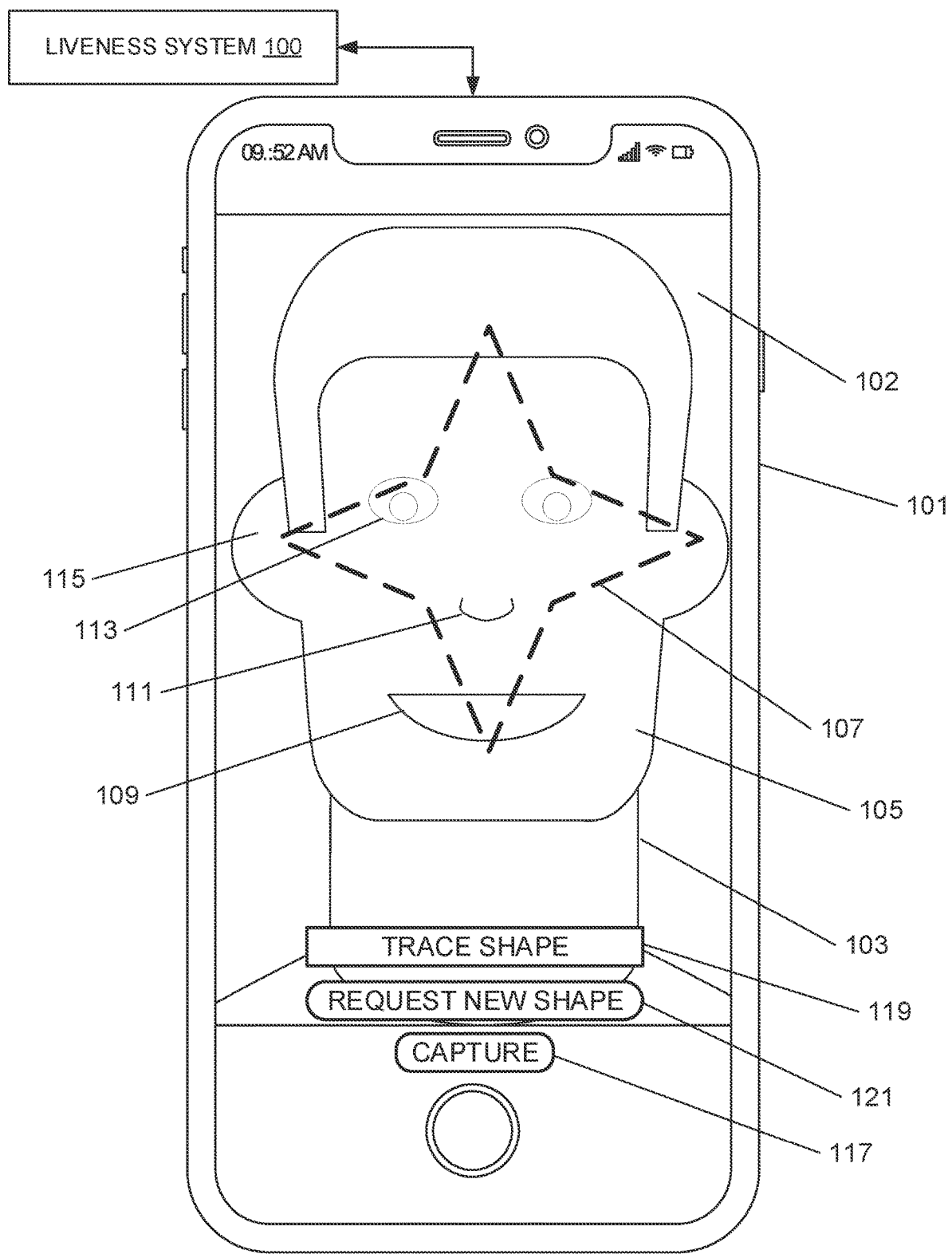
FIG. 1 shows an exemplary liveness system, according to one embodiment of the present disclosure.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

It should also be noted that, as used in the specification and the appended claims, the singular forms "a," "an," and "the" include plural references unless the context clearly dictates otherwise. References to a composition containing "a" constituent is intended to include other constituents in addition to the one named.

Ranges may be expressed herein as from "about" or "approximately" or "substantially" one particular value and/or to "about" or "approximately" or "substantially" another particular value. When such a range is expressed, the various examples of the disclosed technology includes from the one particular value and/or to the other particular value. Further, ranges described as being between a first value and a second value are inclusive of the first and second values. Likewise, ranges described as being from a first value and to a second value are inclusive of the first and second values.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

It is also to be understood that the mention of one or more method steps does not preclude the presence of additional method steps or intervening method steps between those steps expressly identified. Moreover, although the term "step" can be used herein to connote different aspects of methods employed, the term should not be interpreted as implying any particular order among or between various steps herein disclosed unless and except when the order of individual steps is explicitly required. Further, the disclosed technology does not necessarily require all steps included in the example methods and processes described herein. That is, the disclosed technology includes methods that omit one or more steps expressly discussed with respect to the examples provided herein.

Further, the disclosed technology contemplates performance of various method steps and operations in whole, in part, or in combination by a user and/or a computing device or system. For example, the disclosed technology can include a computing device comprising one or more processors and memory having instructions stored thereon that, when executed by the one or more processors, causes the computing device to perform one or more steps or operations, such as one, some, or all of the method steps discussed herein (expressly or impliedly). Alternatively or in addition, the disclosed technology can include input from, or performance by, a user for performance of one, some, or all of the method steps discussed herein (expressly or impliedly).

Also, in describing the examples, terminology will be resorted to for the sake of clarity. It is intended that each term contemplates its broadest meaning as understood by those skilled in the art and includes all technical equivalents, which can operate in a similar manner to accomplish a similar purpose.

Overview

In various embodiments, the present systems and processes verify the liveness of biometric data based on subject performance in a particular task, referred to herein as a "liveness challenge." In at least one embodiment, the disclosed system (e.g., referred to herein as a "liveness system") initiates a liveness challenge by capturing biometric data of a subject via the subject's computing device. In one or more embodiments, the liveness system renders, on the subject's computing device, a user interface including a shape overlay. In various embodiments, during capture of the subject's biometric data, the liveness system receives, via the subject's computing device, a tracing input corresponding to the shape overlay. In at least one embodiment, the liveness system compares the tracing input to the shape overlay, such as by generating a similarity score between the tracing input and the shape overlay. In one or more embodiments, the liveness system positively or negatively verifies the liveness of the biometric data based on the comparison of the tracing input and the shape overlay. In one example, the liveness system compares a similarity score a predetermined liveness threshold and, in response to the similarity score satisfying the liveness threshold, the liveness system positively verifies the liveness of the biometric data. In one or more embodiments, in response to a positive verification of liveness, the liveness system performs additional actions, such as, for example, processing the biometric data and performing biometric verification or identification processes.

Exemplary Embodiments

Referring now to the figures, for the purposes of example and explanation of the fundamental processes and components of the disclosed systems and processes, reference is made to FIG. 1, which illustrates an exemplary liveness system 100. As will be understood and appreciated, the liveness system 100 shown in FIG. 1 represents merely one approach or embodiment of the present system, and other aspects are used according to various embodiments of the present system.

FIG. 1 shows an exemplary liveness system 100 configured to receive and verify the liveness of captures of biometric data. The liveness system 100 can receive captures of biometric data from one or more computing devices 101. The liveness system 100 can include, for example, one more remote server-processors and/or one or more cloud computing environments. The liveness system 100 can communicate with the computing device 101 via one or more networks. In some embodiments, the liveness system 100 includes one or more programs, applications, or other executable instruction that are downloaded or streamed to the computing device 101. In one example, the computing device 101 is a smartphone and, prior to initiation of a biometric capture process, the computing device 101 downloads and installs the liveness system 100, or a subset of system elements, such as a software application (e.g., application 211 shown in FIG. 2 and described herein). In another example, the computing device 101 includes a browser that navigates to a particular network address at which the computing device 101 can communicate with the liveness system 100. The computing device 101 can be any suitable electronic device, such as a smartphones or tablet. The computing device 101 can include, or be connected to, a biometric capture device, such as a camera or audio recorder. The biometric capture device may be referenced herein as an input device (see, e.g., input device 215 shown in FIG. 2 and described herein). The computing device 101 can include one or more displays, such as, for example, a touch receptive display screen (see, e.g., display 213 shown in FIG. 2 and described herein).

The liveness system 100 can include or communicate with one or more systems configured to perform biometric capture processing, verification, and/or identification functions. The liveness system 100 can include or communicate with one or more systems shown or described in:

U.S. application Ser. No. 15/782,940, now U.S. Pat. No. 10,635,894, filed Oct. 13, 2017, entitled "SYSTEMS AND METHODS FOR PASSIVE-SUBJECT LIVENESS VERIFICATION IN DIGITAL MEDIA";

U.S. application Ser. No. 16/403,093, now U.S. Pat. No. 11,288,530, filed May 3, 2019, entitled "SYSTEMS AND METHODS FOR LIVENESS-VERIFIED IDENTITY AUTHENTICATION"; and U.S. application Ser. No. 16/841,269, now U.S. Pat. No. 11,301,586, filed Apr. 6, 2020, entitled "SYSTEMS AND PROCESSES FOR LOSSY BIOMETRIC REPRESENTATIONS," the disclosures of which are incorporated herein by reference in their entireties.

The computing device 101 can include one or more input devices (not shown) configured to capture inputs, such as selections to the user interface 102, biometric features (e.g., in the form of image, video, and/or audio recordings), and potentially other data. A subject 103 can use the computing device 101 to capture an image or other recording of himself or herself for use in biometric processing. The subject 103 can use the computing device 101 to capture a "selfie" image including one or more biometric features, such as, for example, face 105, mouth 109, nose 111, one or more eyes 113, or one or more ears 115. Additional non-limiting examples of biometric features that may be captured include handprint, palm print, fingerprint, vasculature, and/or voice signature.

The computing device 101 can render a user interface 102 for displaying instructions to and receiving inputs from the subject 103. The liveness system 100 can cause the computing device 101 to render a shape overlay 107 onto the user interface 102. The shape overlay 107 refers to an interactive visual representation of a shape, or combination of shapes, that is rendered on the display of the computing device 101 for the purposes of verifying the liveness of a biometric capture. In one example, the computing device 101 activates an onboard camera for capturing a live "selfie" of the subject 103. In this example, the computing device 101 renders a user interface 102 including a live image of the subject 103 being captured by the onboard camera. Continuing the example, to prove the liveness of the image, the liveness system 100 causes the computing device 101 to render the shape overlay 107 over the live image of the subject 103.

The shape overlay 107 can include any suitable shape or combination of shapes, such as, for example, circles, rectangles, diamonds, stars, crosses, or alphanumeric character shapes. In one example, the shape overlay 107 includes a dashed outline of a diamond shape. In some embodiments, the liveness system 100 can detect biometric feature geometry and cause the computing device 101 to render the shape overlay 107 such that the shape overlay 107 overlaps and/or encloses one or more biometric features. In one example, the liveness system 100 receives and processes image data from the computing device 101, detects and extracts the geometry of a face 105 in the image data, and causes the computing device 101 to render the shape overlay 107 such that the shape overlay 107 encloses the face 105 and/or contacts one or more features of the face 105 (e.g., mouth 109, nose 111, eyes 113, or ears 115).

The computing device 101 can render the user interface 102 interactive such that the subject may provide inputs that trace (e.g., highlight or outline) portions of the user interface 102, including portions thereof covered by the shape overlay 107. User inputs for tracing a shape overlay or manipulating a second shape or virtual object based on a shape overlay are referenced herein as "tracing inputs." In one example, a tracing input includes a subject moving a digit or stylus across a touch-capacitive display. In another example a tracing input includes a subject selecting, on a user interface, one or more dots of a rendered dot matrix. In another example, a tracing input includes one or more user inputs for warping or deforming a rendered digital object into a particular shape. In another example, a tracing input includes a motion path of a subject's gaze (e.g., as measured via suitable eye tracking techniques). In another example, a tracing input includes one or more gestures that may be recorded via the computing device 101 and processed by the liveness system 100 to define a motion path (e.g., which may be compared to a shape overlay). A tracing input can include metadata including, but not limited to, timestamp of input initiation, time period of an input action, positional data corresponding to the location(s) of the tracing input on a display, and accelerometer or other sensor data recorded prior to, during, or following a tracing input.

The computing device 101 can receive a tracing input by detecting and recording touch inputs to the user interface 102. For example, the computing device 101 records a tracing input as the subject 103 drags their finger along the portion of the user interface 102 that corresponds to the shape overlay 107. The computing device 101 can precisely and accurately record touch inputs throughout capture of the subject's biometrics and presentation of the shape overlay 107. The liveness system 100 can automatically receive touch inputs from the computing device 101. The user interface 102 can include a capture button that, upon selection, causes the computing device 101 to capture a tracing input and one or more images, videos, or other recordings of the subject 103 and transmit the tracing input and the image to the liveness system 100.

The liveness system 100 can cause the computing device 101 to render one or more instructions 119 that direct the subject 103 to trace the shape overlay 107 and capture their biometric feature(s) via the computing device 101. In some embodiments, the user interface 102 includes a selectable field 121 to replace a current shape overlay 107 with a new shape overlay (e.g., of a different shape, dimension, color, or other property). The liveness system 100 can receive a signal in response to selection of the field 119 and, in response, cause the computing device 101 to render a new overlay 107 on the user interface 102. In some embodiments, the liveness system 100 commands the computing device 101 to perform multiple iterations (e.g., 2, 3, or any suitable number) of rendering overlays, recording tracing inputs, and capturing subject biometrics.

The liveness system 100 can receive one or more tracing inputs and one or more biometric captures from the computing device 102. The liveness system 100 can analyze the tracing input, for example, by comparing the tracing input to the corresponding overlay 107. The liveness system 100 can determine that the tracing input is sufficiently similar to the shape overlay 107 and, in response, determine that the biometric capture corresponds to an unadulterated reproduction of a live subject's biometric feature(s).

Figure 2:
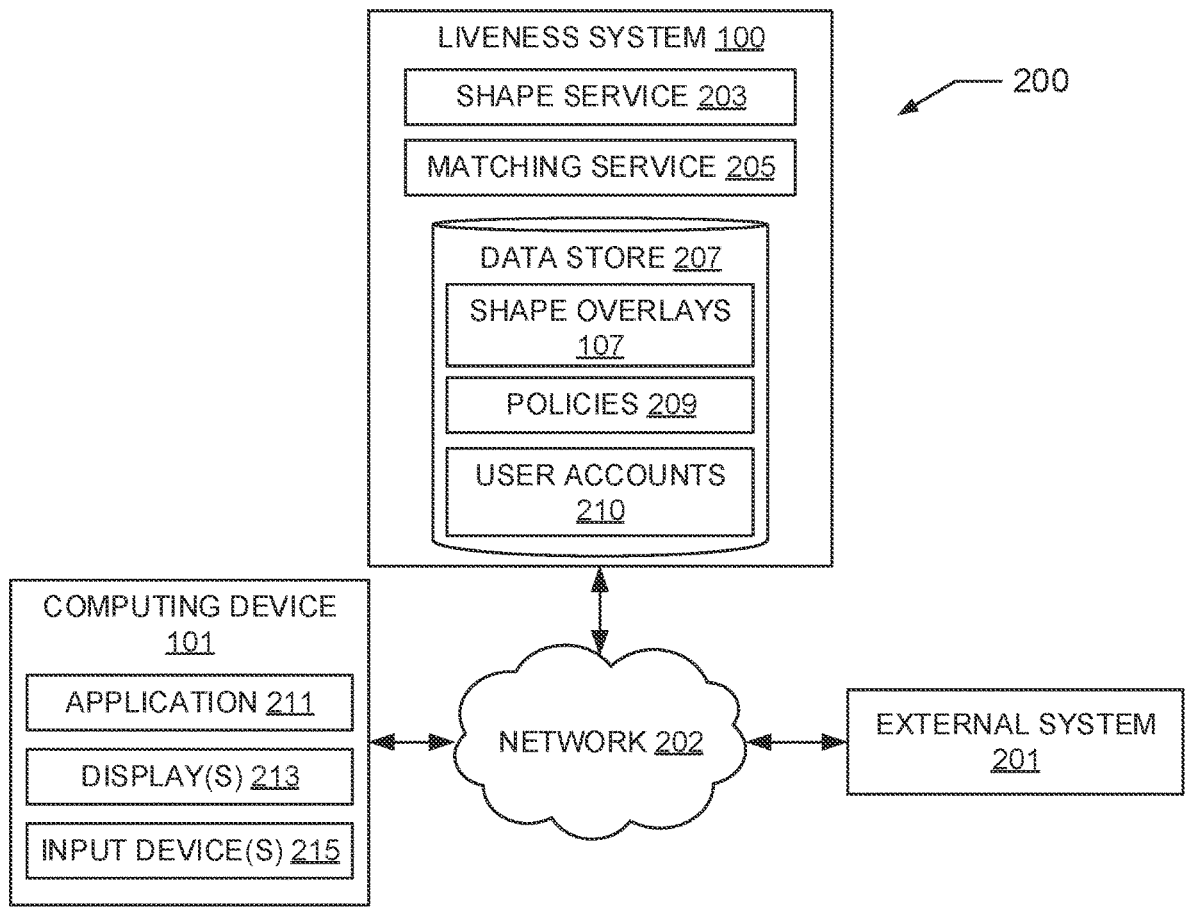
FIG. 2 shows an exemplary liveness system and network environment in which the liveness system may operate, according to one embodiment of the present disclosure.

FIG. 2 shows a network environment 200 in which the present liveness system 100 may operate. In various embodiments, the liveness system 100 is a computing environment that communicates, via a network 202, with one or more computing devices 101, and one or more external systems 201. In one or more embodiments, the liveness system 100 performs processes and actions shown and described herein, such as the liveness process 300 shown in FIG. 3 and described herein. The network 202 includes, for example, the Internet, intranets, extranets, wide area networks (WANs), local area networks (LANs), wired networks, wireless networks, or other suitable networks, etc., or any combination of two or more such networks. For example, such networks can include satellite networks, cable networks, Ethernet networks, and other types of networks. For example, the liveness system 100 can communicate with a first computing device 101 over a first network 202 and communicate with a second computing device 101 over a second network 202.

In at least one embodiment, the liveness system 100 can include a server computer (e.g., a device including memory and one or more processors for executing instructions stored on the memory), or any other system providing computing capability. Alternatively, the liveness system 100 may employ a plurality of computing devices that may be arranged, for example, in one or more server banks or computer banks or other arrangements. Such computing devices can be located in a single installation or may be distributed among many different geographical locations. For example, the liveness system 100 can include a plurality of computing devices that together may include a hosted computing resource, a grid computing resource, and/or any other distributed computing arrangement. In some cases, the liveness system 100 can correspond to an elastic computing resource where the allotted capacity of processing, network, storage, or other computing-related resources may vary over time. Various applications and/or other functionality may be executed in the liveness system 100, according to various embodiments.

The liveness system 100 can include, but is not limited to, a shape service 203, a matching service 205, and one or more data stores 207. Various data are stored in the data store(s) 207 that are accessible to the liveness system 100 and, in some embodiments, an application 211 installed on the computing device 101. The data store 207 can be representative of a plurality of databases as can be appreciated. The data store 207, or elements thereof, can be server-based or blockchain-based. The data stored in the data store 207, for example, may be associated with the operation of the various applications and/or functional entities described below. The data store 207 can include, but is not limited to, shape overlays 107, policies 209, and one or more user accounts 210.

The shape overlay 107 any suitable shape or combination of shapes, such as, for example, circles, rectangles, diamonds, stars, crosses, or alphanumeric character shapes. The shape overlay 107 can include any number of connected, overlapping, or unconnected shapes. The shape overlay 107 can be a polygon or an irregular shape. The shape overlay 107 can be a closed shape or an open shape. The shape overlay 107 can include lines, dot patterns, three-dimensional shapes, shape transformations, and/or shape erasures (e.g., or secondary shapes resulting from erasure of one or more portions of an initial shape). The shape overlay 107 can include or be associated with one or more particular colors, patterns, thicknesses, or other suitable properties. The data store 207 can include multiple sets of shape overlays 107 that may be implemented based on one or more policies 209 (e.g., shape complexity, shape color, shape pattern, etc.). Additional non-limiting examples of shape overlays 107 and shape overlay schemas are show in FIGS. 4-10 and described herein.

The policies 209 can include rules, guidelines, and thresholds for governing processes and operations shown in the figures and described herein. The policies 209 can include rules for generating shape overlays 107 or rules for rendering shape overlays 107 on displays 213. For example, a policy 209 can include associations between particular display or computing device types and shape overlays 107 that may be rendered thereon. As another example, a policy 209 can include associations between particular user accounts 210 and shape overlays 107 that may be used for liveness processes associated with the particular user accounts 210. The policies 209 can include policies for the utilization or generation of shape overlays 107 including, but not limited to, shape dimensions, shape quantity, closed vs. open shape, shape combinations, shape color, shape pattern, and shape complexity (e.g., number of vertices, concavity changes, overlap or connection with other shape overlays).

The policies 209 can include rules for controlling the position of a shape overlay 107 when rendered on the display 213. For example, a policy 209 can include a rule that causes the application 211 to render shape overlays 107 within one or more particular regions of the display 213 (e.g., which may correspond to a left- or right-handedness of the computing device user). As another example, a policy 209 can include a rule that causes the application 211 to receive and/or process accelerometer data or gyroscopic data from one or more sensors of the computing device 101 and render a shape overlay 107 on the display 213 based thereon. For example, the application 211 can process accelerometer data and/or gyroscopic data to predict whether a user is holding their computing device in their left or right hand (e.g., which may be indicated by an orientation or movement of the computing device as evidenced in the sensor data). The policies 209 can include rules for constraining one or more properties of a shape overlay 107, such as color, complexity, or quantity. For example, a policy 209 can include a rule that causes the application 211 to restrict shape overlay challenges to a subset of particular colors, such as black and white, gradients, or other suitable color.

The policies 209 can include rules that govern the manner by which tracing inputs are provided or recorded. For example, a policy 209 can mandate that a user's biometric feature remain in view of a capture device throughout recording of a tracing input. As another example, a policy 209 can mandate that a tracing input be provided via a particular input device 215 or technique, such as a touch input, mouse input, keyboard input, eye movement, or other gestures.

The policies 209 can include rules that control liveness verification processes and determinations. The policies 209 can include one or more threshold values or ranges for evaluating tracing input, such as to determine a shape overlay similarity (e.g., a similarity threshold corresponding to a satisfactory level of similarity between the tracing input (e.g., user input) and the displayed shape overlay 107), as described more fully herein. For example, the policy 209 can include a predetermined similarity threshold between a tracing input and a shape overlay 107 (e.g., a tracing input that satisfies the predetermined similarity threshold may successfully complete a liveness challenge). The predetermined similarity threshold can be a predetermined value of cosine similarity, squared Euclidean distance, Manhattan distance, Minkowski distance, Chebyshev distance, $L^2$ norm distance, or other similarity metric. The predetermined similarity threshold can be a predetermined value of pixel-pixel position similarity, pixel-pixel color similarity, or combinations thereof.

The data store 207 can include predetermined similarity thresholds on a per-user basis, a per-device basis, a per-attempt basis, or a per-shape overlay basis. For example, a policy 209 includes a first similarity threshold for liveness challenges associated with a first user account 210 and a second similarity threshold, different from the first similarity threshold, for liveness challenges associated with a second user account 210. In another example, a first shape overlay 107 of a first shape is associated with a first policy 209 including a first similarity threshold. In the same example, a second shape overlay 107 of a second shape is associated with a second policy 209 including a second similarity threshold different from the first similarity threshold. In another example, a policy 209 can cause the matching service 209 to impose increasing or decreasing similarity thresholds in response to failures of liveness challenges (e.g., following a failed first attempt in a liveness challenge associated with a first similarity threshold, the policy 209 can impose a different similarity threshold for subsequent attempts).

The policies 209 can include one or more threshold values for liveness challenge failures (e.g., 1 attempt, 2 attempts, or any suitable quantity) associated with one or more corresponding "fail" actions, as discussed more fully herein. The policies 209 can include one or more threshold values for sequences of liveness challenges, such as a threshold level of (dis) similarity between shape overlays 107 of subsequent liveness challenges, as discussed more fully herein.

The policies 209 can include parameters for processing biometric data, such as quality thresholds, normalization functions, or processing filters. The policies 209 can include parameters for generating fixed size representations (FXRs) of biometric data, such as transformation parameters, salt values, projection matrices (e.g., or pseudorandom seeds for generating the same), data blending parameters, and nonce or other salt values.

The user account 210 can include credentials for associating the user account 210 with one or more digital accounts, such as social media profiles, digital wallets, and other online accounts. For example, the user account 210 includes a user identifier associated with the liveness system 100 and device data associated with the user's computing device 101 (e.g., contact information, media access control (MAC) address, internet protocol (IP) address, serial number, firmware version, etc.). The user account 210 can include one or more data representations of a user's identity, such as one or more fixed-size representations (FXRs) and/or one or more privacy-secured tokens (e.g., also referable to as "enrollment representations," "lossy representations" or "fuzzy tokens"). The user account 210 can include one or more identifiers for retrieving FXRs, privacy-secured tokens, and potentially other data from the data store 207 or one or more external systems 201. The user account 210 can include associations between the user account 210 and one or more policies 209. For example, the user account 210 can be associated with a policy 209 that, when applied, causes the application 211 to render shape overlays 107 within a particular region of the display 213 (e.g., thereby accommodating for subject handedness, subject reach constraints, or other accessibility considerations). As another example, the user account 210 can be associated with a policy 209 that, when applied, causes the application 211 to restrict shape overlay challenges to a subset of particular colors, such as black and white, gradients, or other suitable color(s) (e.g., thereby accommodating for screen display constrains or color vision issues, such as color blindness).

The shape service 203 can retrieve shape overlays 107 from the data store 207 and/or generate shape overlays 107 via suitable techniques, algorithms, and models. The shape service 203 can process policies 209 to retrieve or generate a particular shape overlay 107, or type thereof. The shape service 203 can process policies 209 to cause the rendering of a shape overlay 107, or associated user interface 102, in a particular manner, such as rendering the shape overlay 107 in a particular region or at with a particular set of dimensions. The shape service 203 can process policies 209 to control various aspects of liveness challenges, such as a tracing input color, tracing input pattern, tracing input line thickness, time period to provide a tracing input (e.g., 5 seconds, 10 seconds, or any suitable value), or presence of a user's biometric feature(s) during tracing input recordation.

The shape service 203 can generate or retrieve shape overlays 107 on a per-user basis, a per-device basis, a per-liveness-check basis, or any combination thereof. For example, the shape service 203 can retrieve shape overlays from a first overlay library for liveness challenges associated with a first user account 210 and retrieve shape overlays from a second overlay library for liveness challenges associated with a second user account 210. In another example, the shape service 203 can generate a first type of shape overlay for liveness challenges associated with a first type of computing device (e.g., brand, operating system, dimension, network or entity affiliation, etc.) and generate a second type of shape overlay for liveness challenges associated with a second type of computing device. In another example, the shape service 203 can generate shape overlays of a particular complexity for a first liveness challenge attempt. In the same example, the shape service 203 can generate a shape overlay of comparatively greater or lower complexity for subsequent liveness challenge attempts (e.g., in response to a failure to complete a preceding liveness challenge).

The shape service 203 can render, or cause the application 211 to render various content on the display 213 of the computing device 101, such as user interfaces, shape overlays 107, instructions, biometric frames, and selectable fields. For example, during capture of a user's biometric features via an input device 215, the shape service 203 renders, on the display 213, a user interface including a shape overlay 107. The shape service 203 can render interactive media for configuring tracing inputs, such as, for example, selectable shape overlay options, selectable tracing input color selectors, selectable tracing input patterns, and selectable tracing input interfaces (see, e.g., the tracing interface 903 shown in FIG. 9 and described herein). The shape service 203, or application 211, can cause the display of user interfaces (e.g., the user interfaces having been pre-rendered and stored at the data store 207, in memory of the computing device 101, or at a data store of an external system 201). In various embodiments, the shape service 203 transmits instructions or prompts to the computing device 101 for presentation to the user thereof. For example, the shape service 205 transmits an instruction to the computing device 101 for rendering, on the display 212, a shape overlay 107 (or a user interface including a shape overlay 107), thereby prompting a user to complete a shape tracing while capturing a video including the user's face or a portion thereof (e.g., the user's full face).

The shape service 203 can receive tracing inputs (e.g., or tracing input data corresponding to tracing inputs) and biometric data from the computing device 101. The shape service 203, or application 211, can receive tracing input data simultaneously with captured biometric data. The shape service 203, or application 211, can receive tracing inputs simultaneously to capturing biometric data of a subject. For example, simultaneously and in substantially real-time, the shape service 203 receives a facial scan of a subject's face and one or more touch inputs that trace a shape overlay 107 rendered on the display 212. The biometric data can include, but is not limited to, facial images, fingerprint images, palm print images, iris scans, hand images, vasculature scans, and biological signals (e.g., vitals, speech signals, voice recordings, etc.). In some embodiments, the biometric data includes unique string data, such as, for example, driver's license number, social security number, address, name, contact information, username, and medical data. In one or more embodiments biometric data includes device data corresponding to the user's computing device 101, such as, for example, network identifier(s), device identifier(s), model number, device serial number, Subscriber Identity Module (SIM) number, build serial number, USB serial number, telephone number, International Mobile Equipment Identity (IMEI) number, Mobile Equipment identifier (MEID) number, electronic serial number (ESN), and international mobile subscriber identity (IMSI) number. Other non-limiting examples of device data include media access control (MAC) address, Bluetooth address, internet protocol (IP) address, subnet, subnet mask, device language, device display dimensions, device display resolution, and/or display color depth. In some embodiments, the biometric data includes a live capture or measurement of a physical object or property thereof.

The shape service 203 can store tracing inputs and biometric data, or fixed-sized representations (FXRs) or privacy-secured tokens derived therefrom, in one or more user accounts 210. The shape service 203, or matching service 205, can generate identifiers for indexing and storing tracing inputs, biometric data, or other data derived therefrom (e.g., FXRs, privacy-secured tokens).

The matching service 205 can perform liveness detection, presentation attack detection, and/or quality assessment processes. For example, the matching service 205 can analyze tracing inputs and/or biometric data to generate one or more measures of liveness. The matching service 205 can process policies 209 and measures of liveness to determine whether biometric data and/or tracing inputs are associated with a live subject. The matching service 205 can generate a measure of similarity between a tracing input and a shape overlay 107. The matching service 205 can compare the measure of similarity to a predetermined threshold. In response to the measure of similarity satisfying the threshold, the matching service 205 can determine that the tracing input (e.g., or biometric data associated therewith) is associated with a live subject. In another example, the matching service 205 can process a tracing input and/or biometric data to generate one or more quality measures, such as a time to provide input, a duration of input, a resolution score, a sharpness score, a magnification score, a brightness score, a contrast score, a blurriness score, a multi-subject score, and a pose estimation score.

The matching service 205 can measure similarity between a tracing input and a shape overlay 107 by any suitable technique(s), algorithm(s), model(s), or combinations thereof. The matching service 205 can, for example, generate fixed-size representations (FXRs), or privacy-secured tokens, of the tracing input and a perimeter of the shape overlay 107 (e.g., or shape defined thereby). The matching service 205 can generate a similarity score between the FXRs and determine whether the similarity score satisfies a predetermined threshold. The matching service 205 can generate a first fixed-size image based on the tracing input and a second fixed-size image based on the shape overlay 107 (e.g., as rendered on the display 212 of the user's computing device 101). The matching service 205 can measure pixel value differences and/or pixel location differences to generate a similarity metric between the first and second fixed-sized images. The matching service 205 can compare the similarity metric to a predetermined threshold to positively or negatively verify liveness. The matching service 205 can determine that the tracing input and shape overlay 107 demonstrate a level of similarity that exceeds a predetermined threshold (e.g., potentially exceeding human abilities and, therefore, potential indicating a fraudulent event, such as a computer-performed tracing input). Thus, the matching service 205 may negatively verify liveness in response to a tracing input being insufficiently similar or overly similar to a shape overlay 107.

The matching service 205 can evaluate, as an input to liveness determinations, metadata corresponding to a tracing input or biometric capture. For example, the matching service 205 can process one or more input timestamps to determine whether the tracing input was provided at a speed exceeding human capabilities, or at a speed falling below a predetermined threshold. As another example, the matching service 205 can determine whether a user's biometric features were in view of the corresponding input device 215 throughout an entirety or predetermined portion of a time period corresponding to the user providing the tracing input.

The matching service 205 can transmit results of operations and processes described herein, such as liveness verification processes or subject identification or verification processes. The matching service 205 can transmits alerts to the computing device 101 and the external system 201. For example, the matching service 205 can transmit an alert to the computing device 101 in response to the liveness system 100 positively or negatively verifying the user's liveness.

The matching service 205 can perform additional proof of liveness processes according to one or more embodiments described in the disclosures incorporated herein by reference. For example, the matching service 205 can perform proof of liveness processes according to one or more embodiments shown or described in U.S. application Ser. No. 16/403,093, now U.S. Pat. No. 11,288,530, filed May 3, 2019, entitled "SYSTEMS AND METHODS FOR LIVENESS-VERIFIED IDENTITY AUTHENTICATION," the disclosure of which is incorporated herein by reference in its entirety.

The matching service 205 can generate fixed-size representations (FXRs) of tracing inputs, biometric data, or combinations thereof. The matching service 205 can store the FXRs, or privacy-secured tokens derived therefrom, in one or more user accounts 210, or otherwise at the data store 207, such as in one or more ledgers or registries. In one example, the matching service 205 can receive a facial image of a subject. The matching service 205 can generate an FXR based on the facial image. The matching service 205 can generate a privacy-secured token based on the FXR via a lossy tokenization process.

The matching service 205 can process biometric data to generate secondary identity biometric data for processing operations, such as transformation into a fixed-size representation (FXR). The matching service 205 can perform biometric feature detection and extraction to identify and extract particular biometric features in an image (e.g., face, nose, iris, ears, mouth, finger, etc.). The matching service 205 can perform anatomy detection, alignment, and cropping processes to generate anatomical images. The matching service 205 can generate privacy-secured tokens on FXRs of biometric data. The matching service 205 can directly or sequentially blend FXRs to generate privacy-secured tokens based on multiple FXRs. In one or more embodiments, the privacy-secured tokens are cancellable (e.g., the token can be revoked and the user associated therewith can be re-registered). The matching service 205 can generate secure sketches that encode a secret value, such as a seed value for seeding key derivation functions. In at least one embodiment, the FXRs and privacy-secured tokens (e.g., and, thereby, the secure sketches derived therefrom) satisfy various security standards including, but not limited to, irreversibility, unlinkability, and ability to be processed at scale and speed.

In one or more embodiments, the matching service 205 generates fixed-size representations (FXRs) of string-formatted biometric data. Non-limiting examples of the FXR include vectors and histograms. In at least one embodiment, the matching service 205 encodes a string-formatted data into one or more vector representations. For example, the matching service 205 can encode a driver's license number into a fixed-length vector. The matching service 205 can encode a text string into two or more discrete representations (e.g., bi-grams or other n-grams). The matching service 205 can map the two or more discrete representations onto a co-occurrence matrix that represents a distribution of the discrete representation values. The matching service 205 cam apply one or more smoothing functions to the co-occurrence matrix. For example, the matching service 205 applies Gaussian kernels of varying width to the co-occurrence matrix, thereby generating a plurality of Gaussian-transformed co-occurrence matrices. The matching service 205 can perform a linear kernel combination of the Gaussian-transformed co-occurrence matrices to generate a smoothed co-occurrence matrix. The matching service 205 can perform a normalization operation on the smooth co-occurrence matrix to generate a FXR (e.g., a unit normalized vector).

The matching service 205 can perform digital conversion, hashing, and other suitable processes for translating biometric data from a variable-size representation to a fixed-size representation. The matching service 205 can generate fixed-size representations (FXRs) based on one or more transformation parameters, and can define the one or more transformation parameters based on a pseudo-randomly generated value (e.g., referred to as a pin or a seed value) or other secret data, such as, for example, a user account identifier, an identifier associated with a subject's computing device 101, or a keyword or phrase received from the computing device 101. Non-limiting examples of transformation parameters, include salt values that may be added to object data (e.g., for increasing the security of the fixed-size representation) and spherical whitening parameters.

The matching service 205 can generate a privacy-secured token by concatenating a fixed-size representation (FXR) with a cryptographic key (e.g., from a pseudorandomly seeded cryptographic key derivation function), or other secret data, to generate a concatenated representation. The matching service 205 can permute the concatenated representation with the FXR and/or the cryptographic key to generate a permuted representation. The matching service 205 can generate or retrieve one or more transformation parameters and projects the permuted representation based on one or more transformation parameters to generate a privacy-secured token.

In one example, the matching service 205 can generate a pseudorandom projection matrix based on a seed value. The matching service 205 can multiply an FXR of biometric data by the pseudorandom projection matrix to generate a privacy-secured token. According to one embodiment, the privacy-secured token generated by the matching service 205 can be revoked and replaced with new tokens. In at least one embodiment, old and the new privacy-secured tokens cannot be linked together (e.g., a security property referred to as "non-linkability"). The privacy-secured token can be lossy such that the privacy-secured token cannot be reverse-engineered to recover, access, or discern the source FXR(s) or biometric data. In one or more embodiments, the matching service 205 applies a whitening transformation (e.g., such as an iterative spherical whitening transformation) to FXRs prior to converting the FXRs to privacy-secured tokens. According to one embodiment, the whitening transformation improves token security by increasing a difficulty of reversing an irreversible transformation or reconstructing identity data with which a privacy-secured token is associated.

The matching service 205 can generate multi-factor and/or privacy-secured tokens by blending different FXRs associated with the same or different biometric data (e.g., different biometric features, different personal identifiable data, different device data, and combinations thereof). By blending the FXRs, the matching service 205 can generate a blended FXR and generating a privacy-secured token based thereon. In one or more embodiments, the matching service 205 performs direct blending. According to one embodiment, direct blending includes simultaneous blending of all FXR modalities to be included in the output FXR (e.g., a blended FXR). In other words, in direct blending, the matching service 205 can perform simultaneous blending of all input FXRs. In at least one embodiment, the matching service 205 performs sequential blending. In various embodiments, sequential blending includes blending a first modal FXR with a secret (e.g., a PIN, or another fixed size representation or privacy-secured token thereof) to generate a first blended representation and blending the first blended representation with one or more FXRs of other data modalities. In other words, in sequential blending, the matching service 205 can perform step-wise blending of inputs in which a first input FXR is blended with a secret and the output thereof is blended with a second input FXR (e.g., the output FXR thereof potentially being blended with a third input and so on for any suitable number of inputs). In one example, the matching service 205 generates a privacy-secured token based on a combination of a facial scan-derived FXR and a fingerprint image-derived FXR. In various embodiments, the matching service 205 generates FXRs, privacy-secured tokens, or secure sketches according to one or embodiments described in U.S. application Ser. No. 17/230,684, filed Apr. 14, 2021, titled "SYSTEMS AND METHODS FOR MULTIMODAL BIOMETRICS," the disclosure of which is incorporated herein by reference in its entirety.

The computing device 101 can include any electronic systems and device configured to capture a user's biometric data (e.g., or receive biometric data from a capture device), display user interfaces, and receive and transmit user inputs and biometric data. Non-limiting examples of the computing device 101 include mobile devices (e.g., such as smartphones, tablets, smart accessories, etc.), laptops, security devices, network-enabled camera systems, and Internet of Things (IoT) devices. The computing device 101 can include, but is not limited to, an application 211, one or more displays 213, and one or more input devices 215.

The application 211 can be configured to access and/or perform services and functions of the liveness system 100 and transmit data between the computing device 101 and the liveness system 100, one or more external systems 201, or other computing devices 101. In some embodiments, a liveness verification process includes installing and/or registering the application 211 to the computing device 101. In one or more embodiments, the application 211 is associated with accessing and controlling a subject's user account 210 and other digital accounts, such as social media accounts, digital wallets, and other online profiles. In some embodiments, the application 211 is representative of a plurality of different applications. For example, a first application 211 may be associated with accessing services of the liveness system 100 and a second application 211 may be associated with accessing services of an external system 201. In one or more embodiments, enrolling a user into the liveness system 100 may include associating a user account 210 of a first application 211 with a second user account of a second application 211 (e.g., such that login or other verification operations for the second user account are performed in association with the first user account 210 and the liveness system 100).

In one or more embodiments, the application 211 generates and causes the computing device 101 to render user interfaces for accessing services and functions of the liveness system 100, for rendering instructions and other information from the liveness system 100, and for receiving input from the user (e.g., tracing inputs, selections to fields, typed inputs, etc.). In one example, the application 211 generates a user interface including a biometric facial frame, a shape overlay 107, and instructions to capturing a facial scan within the facial frame while providing a tracing input for the shape overlay 107. In one or more embodiments, the computing device 101 includes memory for storing various data, such as, for example, shape overlays 107 or policies 209.

The display 213 can include, for example, one or more devices such as liquid crystal display (LCD) displays, gas plasma-based flat panel displays, organic light-emitting diode (OLED) displays, electrophoretic ink (E ink) displays, LCD projectors, or other types of display devices, etc. Non-limiting examples of the input device 215 include touch-capacitive or touch-resistive screens, keyboards, cursor devices, gesture recognition devices, virtual or augmented reality devices, onboard cameras, scanners, audio recording devices, or an external scanning or recording system. In at least one embodiment, the application 211 receives biometric data, or a tracing input, via the input device 215 and processes the biometric data through a biometric matcher to generate a FXR (e.g., according to a particular capture software development kit (SDK) and a particular matcher SDK). The application 211, or liveness system 100, can encode biometric features into FXRs by processing the biometric features via one or more machine learning models, such as, for example, convolutional neural networks, recurrent neural networks, long short-term memory networks, auto-encoders, deep Boltzman machines, or deep belief networks.

In one or more embodiments, the external system 201 includes any digital system, platform, application, or service associated with performing actions on behalf of or providing services to a user (e.g., or a system or entity associated with a user). For example, the external system 201 can include systems for managing, providing, or controlling a subject's digital profiles, wallets, or accounts. In various embodiments, the external system 201 includes any digital system, platform, application, or service that implements or requires digital authentication of a subject and/or privileges or possessions thereof. Non-limiting examples of the external system 201 include social media platforms, digital trading systems, cryptographic asset wallets, and public or private services for managing health information, voter registration, or financial assets. In various embodiments, the external system 201 can transmit, to the communication service 305, requests for verification of a subject's identity, ownership of a computing device 101, possession of a physical object, association with a unique string, or combinations thereof. In one or more embodiments, the external system can receive, from the communication service 305, positive verifications or negative confirmations of subject identity, ownership, possession, and/or association.

Figure 3:
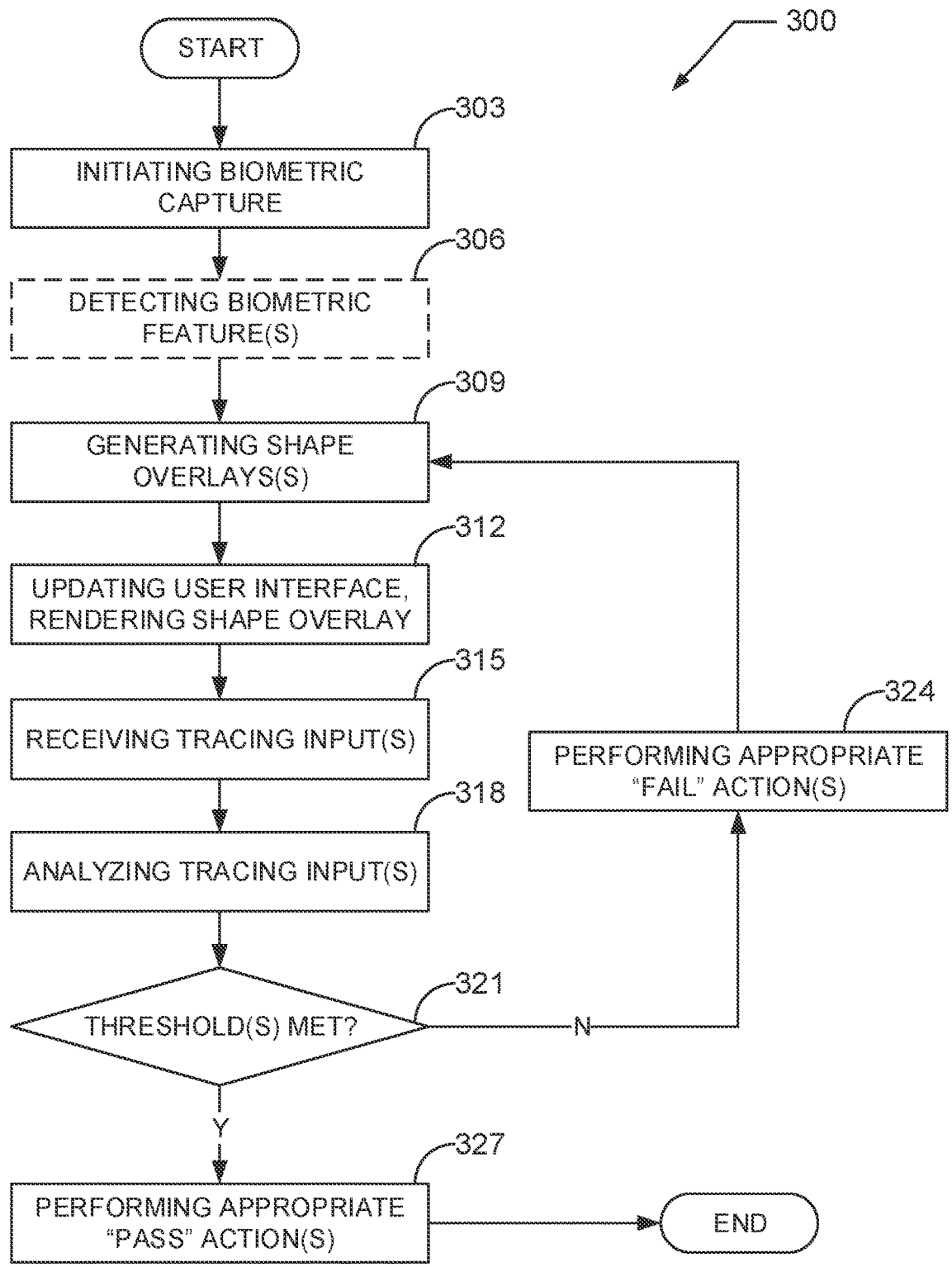
FIG. 3 shows an exemplary liveness verification process, according to one embodiment of the present disclosure.

FIG. 3 shows an exemplary liveness verification process 300. As will be understood by one having ordinary skill in the art, the steps and processes shown in FIG. 3 (and those of all other flowcharts and sequence diagrams shown and described herein) may operate concurrently and continuously, are generally asynchronous and independent, and are not necessarily performed in the order shown. The liveness system 100 can perform the process 300 to receive a biometric capture and verify that the biometric capture corresponds to unadulterated reproduction of a live subject's biometric feature(s).

At step 303, the process 300 includes initiating a capture of biometric data at a subject's computing device 101. The application 211 or the shape service 203 can initiate the biometric capture by activating an input device 215, such as an onboard camera. The application 211 or shape service 203 can render, on the display 213 of the computing device 101, a frame, a pose instruction, a phrase instruction, or other prompt that instructs the subject on how to capture the biometric data. In at least one embodiment, the biometric capture is initiated in response to the initiation of a biometric authentication process for identifying and/or verifying the identity of the subject. For example, the subject uses the computing device 101 in an attempt to access a secure digital environment via biometric verification. Continuing the example, to perform the biometric verification, the liveness system 100 causes the computing device 101 to activate a camera device for capturing a selfie of the subject. The shape service 203, or application 211, can render, or otherwise cause the display of, a user interface on the display 213 thereof (see, for example, user interface 102 of FIG. 1). The shape service 203 can cause the computing device 101 to render a user interface including a live image from the capture device and instructions for capturing one or more biometric features and for completing one or more liveness tests (e.g., tracings of one or more shape overlays 107).

In at least one embodiment, the liveness system 100 initiates the process 300 in response to a request from the computing device 101 or an external system 201. In one example, the computing device 101 receives an encrypted communication that may be unlocked (e.g., decrypted) by the liveness system 100 or application 211 in response to positively verifying biometric data of the subject (e.g., via 1:1 biometric verification or 1:N biometric identification). In this example, automatically or in response to a user input for accessing the encrypted communication, the liveness system 100 initiates a biometric verification process to authenticate biometric data of the subject, the biometric verification process including the process 300. In another example, the application 211 encrypts and transmits a communication to another computing device 101 or an external system 201 in response to positively verifying biometric data of the subject (e.g., including verifying the liveness thereof).

In another example, in response to the subject attempting to login to an account, the liveness system 100 receives a request from a social media platform or other corresponding external system 201 that manages the account. In this example, the liveness system 100 can perform a biometric authentication process as a login operation on behalf of the subject and the social media platform. The biometric authentication process can include the liveness system 100 performing the process 300 to verify the liveness of the subject's captured biometric data before performing additional authentication steps.

At step 306, the process 300 includes detecting one or more biometric features of the subject. The computing device 101 can record and transmit image, video, and/or audio data to the liveness system 100. The shape service 203, or matching service 205, can perform one or more analyses of the image data to identify biometric features included therein, such as, for example, a face, a nose, eyes, and ears. In some embodiments, if the liveness system 100 is unable to identify one or more biometric features, the liveness system 100 suspends the process 300. The matching service 205 can generate or extract geometric data based on the detected biometric features. In various embodiments, the shape service 203 uses the geometric data as an input to generating and/or applying one or more overlays 107 to the live image being displayed on the computing device 101. For example, at step 309, the shape service 203 uses the geometric data to generate a shape overlay 107 that precisely and accurately conforms to the contours of a subject's face. Continuing the example, at step 312, the liveness system 100 causes the computing device 101 to render the conformal shape overlay 107 onto the live image of the subject's face.

In some embodiments, the process 300 omits step 306 and proceeds from step 303 to step 309. For example, the process 300 may omit step 306 in instances where the shape overlay 107 is not mapped to a subject's facial geometry, or other biometric. As another example, the process 300 may omit step 306 in instances where the captured biometric feature is a voice record or other non-visual biometric signature, such as odor.

At step 309, the process 300 includes generating one or more shape overlays 107. The shape service 203 can generate a shape overlay 107 based on a suitable technique, algorithm, model, or combinations thereof. The shape service 203 can retrieve one or more stored shape overlays 107 from the data store 207. The shape service 203 can retrieve a shape overlay 107 from a library of shape overlays 107 stored in a remote database of an external system 201. The shape service 203 can retrieve or generate a shape overlay 107 based on a pseudo-random seed value and/or based on one or more policies 209. Non-limiting examples of policies 209 include number of shape overlays 107, shape overlay complexity or difficulty (e.g., length, number of curves, angles, etc.), shape combinations, and shape-to-biometric feature mapping. The liveness system 100 can perform one or more overlay generation algorithms or techniques to generate a shape overlay 107. The shape service 203 can generate sets of shape overlays 107 of varying composition and complexity. For example, the shape service 203 can generate a set of concentric circular shape overlays 107 (e.g., the subject being instructed to trace a particular one or all of the concentric circular shapes). In some embodiments, the shape service 203, or application 211, causes the computing device 101 to render two or more shape overlay options that, upon selection, cause the shape service 203 to generate a particular shape overlay 107 corresponding to the selected option.

The shape service 203 can transmit the shape overlay 107 to the computing device 101. In some embodiments, the liveness system 100 causes the computing device 101 to generate the shape overlay 107 locally. In various embodiments, the liveness system 100 stores the shape overlay 107 in one or more data stores, thereby enabling retrieval of the shape overlay 107 for purposes of comparison and authentication.

At step 312, the process 300 includes updating the user interface to include one or more shape overlays 107. The liveness system 100 can cause the computing device 101 to render the shape overlay 107 over the real-time image of the subject being displayed within the user interface. The liveness system 100 can cause the computing device 101 to render instructions that instruct the subject to trace the shape overlay 107 via touch, or another suitable input. The liveness system 100 can cause the computing device 101 to render multiple shape overlays 107 and an instruction that instructs the subject to trace a particular shape overlay 107 (e.g., ignoring the other shape overlays 107 being displayed). The liveness system 100 can cause the computing device 101 to render a selectable field for initiating capture and transmission of the live biometric image and the subject's tracing input(s).

At step 315, the process 300 includes receiving one or more tracing inputs (e.g., data indicative of the one or more tracing inputs) from the computing device 101. The shape service 203 can receive, from the computing device 101, one or more tracing inputs and, in some embodiments, biometric data, such as a video recording of the subject's face. The shape service 203, or application 211, can cause the computing device 101 to update the user interface as touch inputs are received. For example, the computing device 101 applies a shading or coloration effect to regions of the user interface (or shape overlay 107) corresponding to the subject's touch input.

The tracing input can be recorded in any suitable file format, such as, for example, a video recording, one or more images (e.g., an image capturing an overall tracing of a shape overlay 107 based on one or more inputs), or input mapping data, such as coordinates corresponding to where the computing device 101 display was touched. The shape service 203, or application 211, can store the tracing input in the data store 207 and/or in local memory of the computing device 101. The shape service 203 and application 211 can refrain from storing biometric data in any permanent memory and can delete the biometric data immediately upon the matching service 205 negatively verifying liveness or generating a fixed-size representation of the biometric data. In one or more embodiments, the shape service 203 receives and/or captures metadata corresponding to the biometric capture or touch input. For example, the shape service 203 receives motion data from an accelerometer on the computing device 101. In this example, the motion data can correspond to a period immediately preceding, during, and/or immediately following capture of the subject's tracing input or biometric(s).

At step 318, the process 300 includes analyzing the tracing input, data corresponding to the tracing input (e.g., "tracing input data"), or a combination thereof. The matching service 205 can compare the tracing input to the corresponding shape overlay 107 that was rendered on the computing device 101 display. Based on the comparison, the matching service 205 can determine a similarity score or other metric that quantifies the precision and accuracy of the tracing input to the shape overlay 107. Non-limiting examples of similarity metrics include cosine similarity, squared Euclidean distance, Manhattan distance, Minkowski distance, Chebyshev distance, and $L^2$ norm distance. In one example, the matching service 205 determines how precisely the tracing input aligns with the contours of the shape overlay 107. In another example, the matching service 205 computes and compares the geometric areas enclosed by the tracing input and the shape overlay 107. The matching service 205 can also analyze metadata corresponding to the tracing input. For example, the matching service 205 can determine whether changes in accelerometer data correspond to expected changes based on the tracing input. In another example, the matching service 205 can analyze a motion pattern and duration of the tracing input to predict whether the tracing input was provided by a living human subject or a machine. In some embodiments, the liveness system 100 performs multiple iterations of rendering shape overlays 107 and receiving tracing inputs for the same. In various embodiments, the matching service 205 determines a similarity metric for each iteration and generates an overall similarity metric by performing a weighted or unweighted average of the similarity metrics.

At step 321, the process 300 includes determining whether the tracing input, or similarity metric(s) determined therefrom, met one or more predetermined thresholds. For example, matching service 205 compares the similarity metric of step 318 to a predetermined minimum similarity threshold. In another example, the matching service 205 first determines that the tracing input corresponds to a particular shape overlay 107 of a plurality of shape overlays 107 being rendered on the user interface of the computing device 101. In the same example, the matching service 205 can retrieve and process a policy 209 including a predetermined similarity threshold corresponding to the particular shape overlay 107. The matching service 205 can determine that the similarity metric meets the predetermined similarity threshold. In one or more embodiments, in response to determining that the tracing input fails to meet one or more thresholds, the process 300 proceeds to step 324. In various embodiments, in response to determining that the tracing input meets one or more thresholds, the process 300 proceeds to step 327.

At step 324, the process 300 includes performing one or more appropriate "fail" actions. Non-limiting examples of fail actions include suspending the process 300, causing the computing device 101 to update the user interface, transmitting an alert, or initiating one or more additional liveness verification operations. In one example, the matching service 205 transmits an alert to the computing device 101, the alert causing the computing device 101 to render a failure message, such as "Error, Unable to Verify Liveness." In the same example, the liveness system 100 can return to step 309 of the process 300, in which the shape service 203 causes the computing device 101 to render an additional shape overlay 107 and capture an additional tracing input (e.g., and, in some embodiments, an additional biometric image). In another example, the matching service 205 can perform one or more passive liveness verification techniques (e.g., such as those described in the incorporated references) to attempt a secondary means of verifying that the biometric capture is an unadulterated reproduction of a live subject.

At step 327, the process 300 includes performing one or more appropriate "pass" actions. Non-limiting examples of pass actions include generating a fixed-size representation (FXR) and/or privacy-secured token based on the biometric data of the subject, performing one or more biometric verification or identification operations, providing the subject access to a digital or physical environment, processing a request on behalf of the computing device 101, or transmitting an alert to the subject's computing device 101, an external system 201, and/or additional computing devices 101. In one example, to perform biometric identification, the matching service 205 transforms the biometric data into an irreversibly transformed, privacy-secured token and compares the same to a plurality of stored tokens. In another example, to perform biometric verification, the liveness system 100 transforms the biometric capture into a fixed-size biometric template (e.g., a "probe" template), retrieves a stored fixed-size biometric template associated with the computing device 101 (e.g., or a user account or other identifier of the subject), and compares the probe template to the stored template.

In another example, the matching service 205 can generate a privacy-secured token based on the biometric data. The matching service 205 can compare the privacy-secured token to a second privacy-secured token associated with the subject's user account 210 (e.g., an enrollment token). The matching service 205 can determine that the privacy-secured token demonstrates a threshold-satisfying similarity to the second privacy-secured token. In response to the determination, the liveness system 100 can perform additional actions, such as decrypting an encrypted communication, rendering the decrypted communication on the computing device 101, approving or disapproving a transaction, generating an encrypted communication, or storing one or more files in association with the subject's user account 210.

Figure 4:
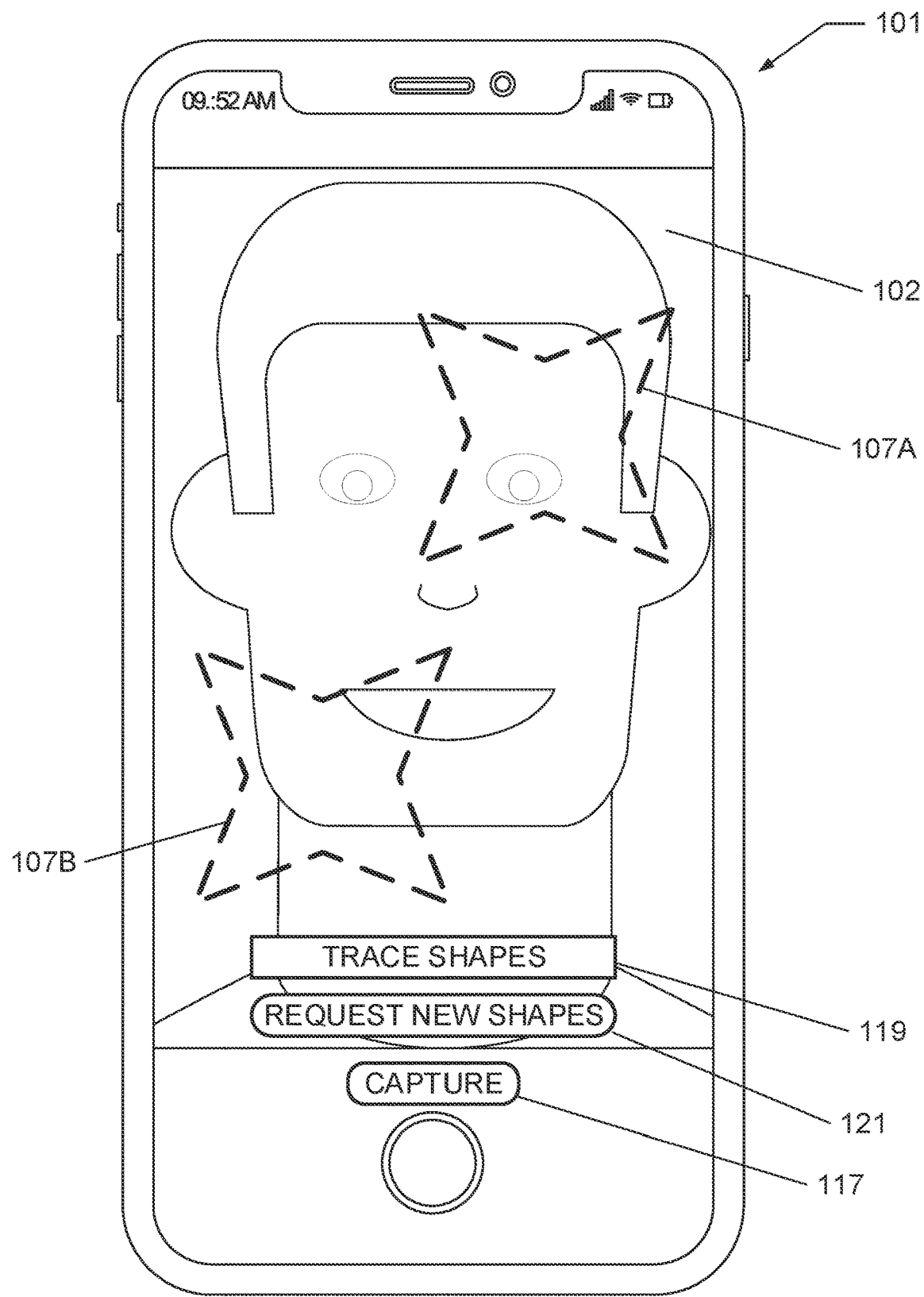
FIG. 4 shows an exemplary computing device and user interface, according to one embodiment of the present disclosure.

FIG. 4 shows an exemplary computing device 101 and user interface 102. As shown in the user interface 102 of FIG. 4, a liveness challenge can include multiple shape overlays 107, such as a first shape overlay 107A and a second 107B. The second shape overlay 107B can be the same as or different from the first shape overlay 107A (e.g., size, shape). The second shape overlay 107B can be located a position on the display 213 that is separate from the position of the first shape overlay 107A (e.g., as shown in FIG. 4). Alternatively, some or all of the second shape overlay 107B can overlap or otherwise coincide with a portion of (or all of) the first shape overlay 107A (e.g., as shown in FIG. 5).

Figure 5:
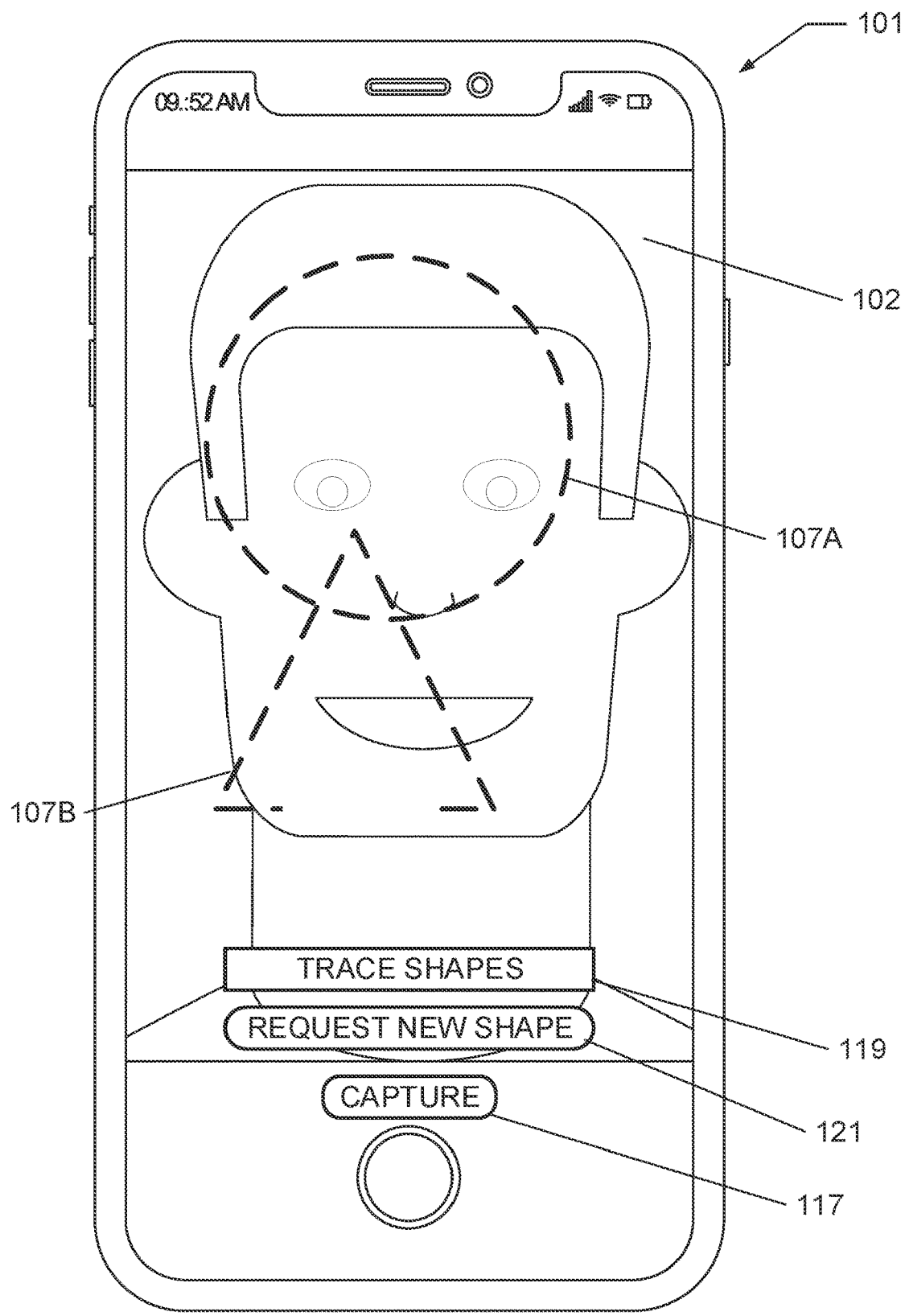
FIG. 5 shows an exemplary computing device and user interface, according to one embodiment of the present disclosure.

FIG. 5 shows an exemplary computing device 101 and user interface 102. As shown in the user interface 102 of FIG. 5, a liveness challenge can include multiple shape overlays 107A, 107B of differing type. For example, the shape overlay 107A includes a circle shape and the shape overlay 107B includes a triangle shape. Further, a shape overlay can include a closed shape (see, e.g., shape overlay 107A in FIG. 5) or an open shape (see, e.g., shape overlay 107B in FIG. 5).

Figure 6:
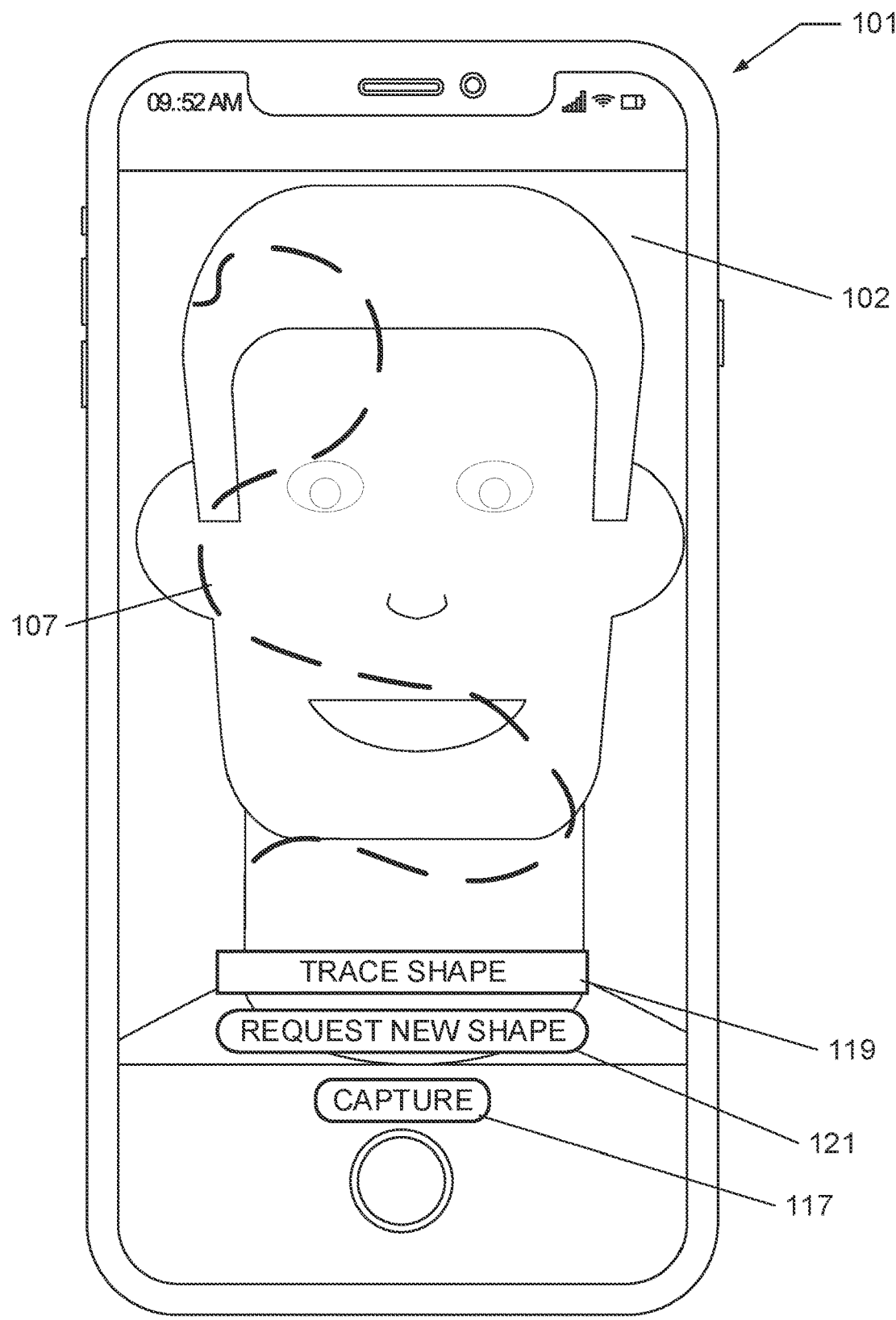
FIG. 6 shows an exemplary computing device and user interface, according to one embodiment of the present disclosure.

FIG. 6 shows an exemplary computing device 101 and user interface 102. As shown in the user interface 102, a liveness challenge can include one or more irregular-shaped shape overlays 107. The irregular-shaped overlay 107 includes, for example, a line segment, curve, or non-polygonal shape.

Figure 7A:
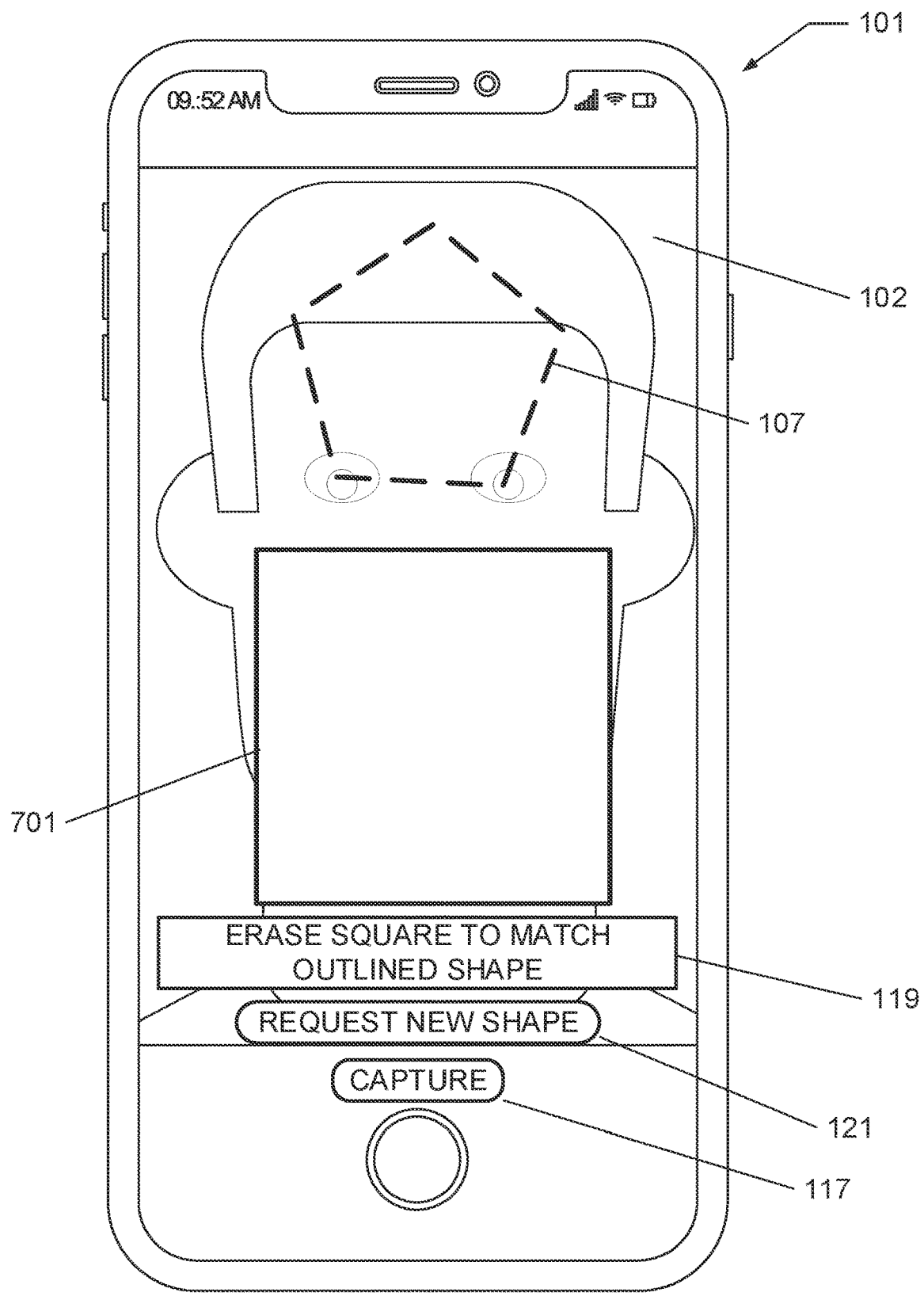
FIG. 7A shows an exemplary computing device and user interface, according to one embodiment of the present disclosure.

FIG. 7A shows an exemplary computing device 101 and user interface 102. As shown in the user interface 102 of FIG. 7, a liveness challenge can include a shape overlay 107 and a shape 701 to be erased or deformed into a second shape corresponding to the shape overlay 107. The application 211, or shape service 203, can initiate a liveness challenge in which a subject is prompted to erase one or more portions of the shape 701 (e.g., or, alternatively, deform the shape 701) to generate a second shape that is similar to the shape overlay 107. The application 211 can render, on the user interface 102, an instruction 119 that instructs the subject to erase portions of the shape 701 to match the shape overlay 107. For example, the shape 701 includes a square shape and the instruction 119 prompts the subject to "erase square to match outlined shape," the outline shape referring the shape overlay 107.

Figure 7B:
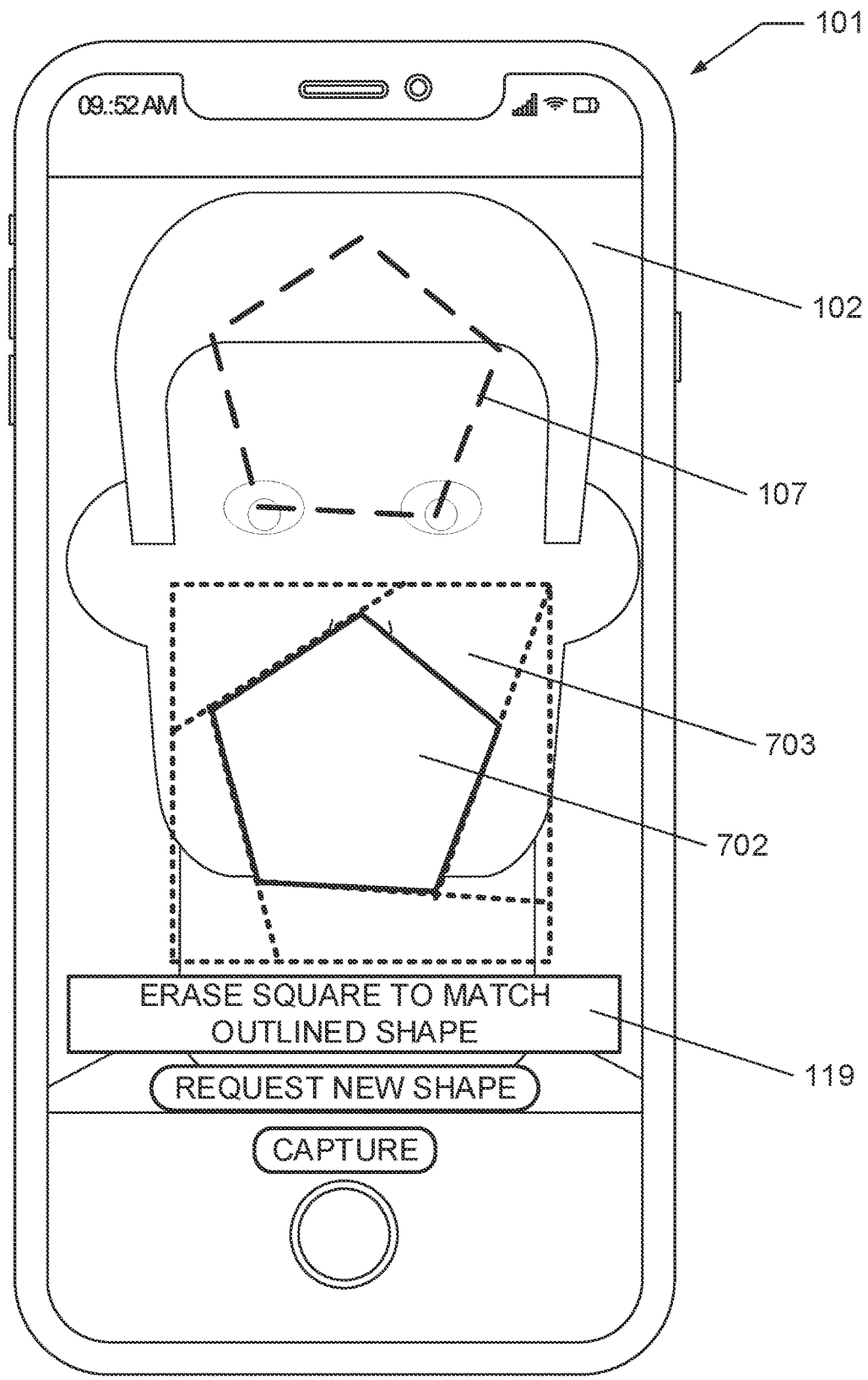
FIG. 7B shows an exemplary computing device and user interface, according to one embodiment of the present disclosure.

FIG. 7B shows an exemplary computing device 101 and user interface 102. In various embodiments, the user interface 102 shown in FIG. 7B is subsequent to the user interface 102 shown in FIG. 7A. For example, the user interface 102 shown in FIG. 7B can correspond to the user interface 102 shown in FIG. 7A following receipt and processing of one or more tracing inputs for erasing portions of the shape 701 shown in FIG. 7A. The tracing input can be a plurality of tracing inputs. The tracing input can include one or more erasures of one or more portions of the shape 701 shown in FIG. 7A. An erasure can be a selection of a particular region of a shape (e.g., the particular region intending to be erased from the shape). The application 211 can update the user interface 102 of FIG. 7A based on the tracing inputs, thereby rendering the user interface 102 shown in FIG. 7B.

The user interface 102 can include one or more erased portions 703 and a non-erased portion 702. The erased portion(s) 703 and non-erased portion 702 can correspond to particular regions of the shape 701 shown in FIG. 7A. In some embodiments, the erased portions 703 are indicated to the user of the computing device 101, such as via dashed lines, patterning, or colorations. In at least one embodiment, the erased portions 703 are omitted and only the non-erased portion 702 of the shape 701 (FIG. 7A) is rendered on the user interface 102. The matching service 205 can determine a result of the liveness challenge by comparing the non-erased portion 702 (e.g., or a perimeter thereof) to the shape overlay 107.

Figures 8A, 8B:
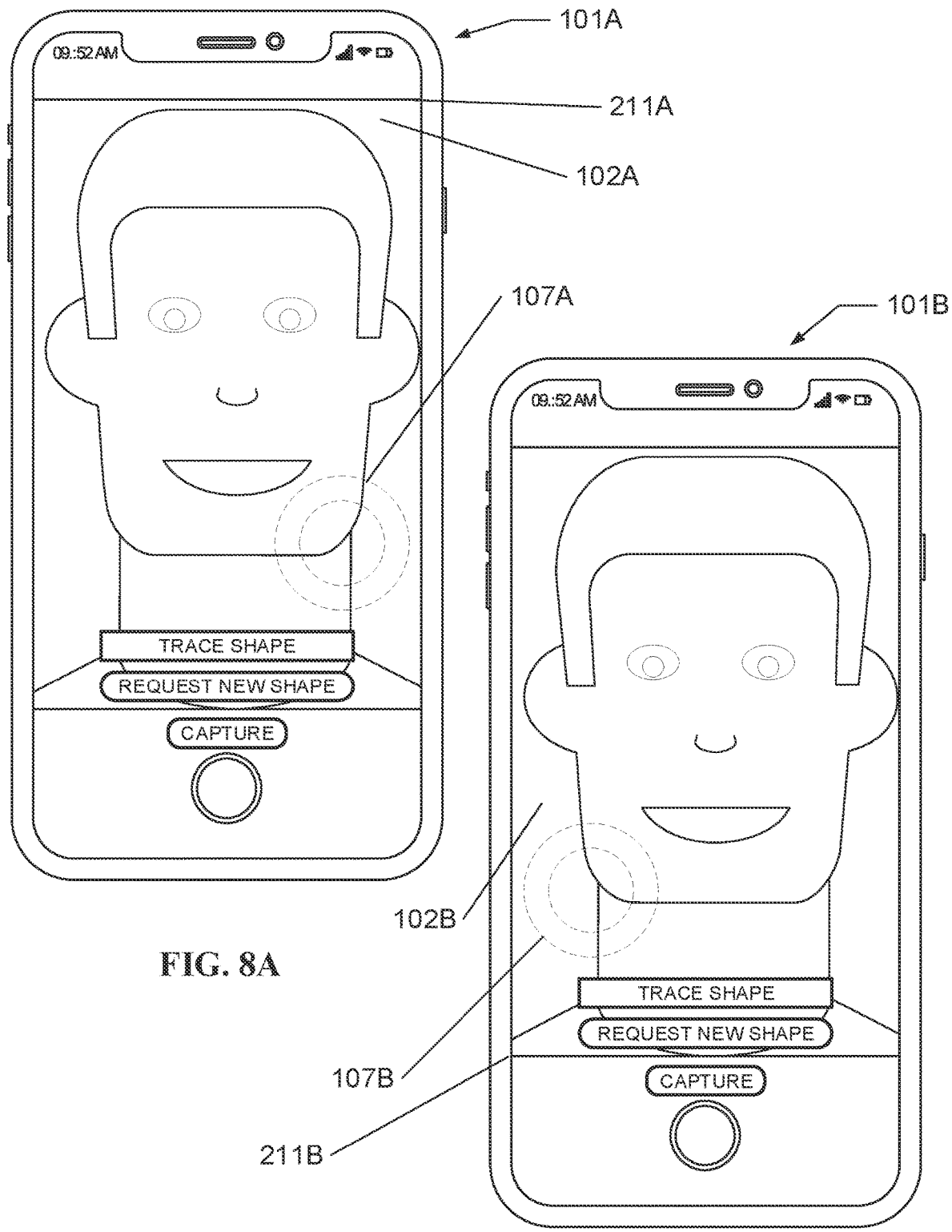
FIG. 8A shows an exemplary computing device and user interface, according to one embodiment of the present disclosure.
FIG. 8B shows an exemplary computing device and user interface, according to one embodiment of the present disclosure.

FIG. 8A shows an exemplary computing device 101A, display 211A, and user interface 102A. FIG. 8B shows an exemplary computing device 101B, 211B, and user interface 102B. As described herein, the shape service 203 can process one or more policies 209 to render a user interface and shape overlay. As shown in FIGS. 8A, 8B, the shape service 203 can render a shape overlay in a particular region of a display based on one or more policies 209.

In FIG. 8A, the shape service 203 renders a shape overlay 107A on a rightward region of the display 211A. The shape service 203 can process a policy 209 that causes the shape service 203 to render the shape overlay 107A in the rightward region. For example, the policy 209 can be a handedness rule or setting (e.g., thereby better accommodating users that hold their computing device 101 in their right hand).

In FIG. 8B, the shape service 203 renders a shape overlay 107B on a leftward region of the display 211B. The shape service 203 can process a policy 209 that causes the shape service 203 to render the shape overlay 107A in the leftward region. For example, the policy 209 can be a handedness rule or setting (e.g., thereby better accommodating users that hold their computing device 101 in their left hand). As another example, the policy 209 can be a hand size policy that causes the shape service 209 to render a shape overlay closer to or further from a bottom region of a display (e.g., to better accommodate users of varying hand sizes).

Figure 9:
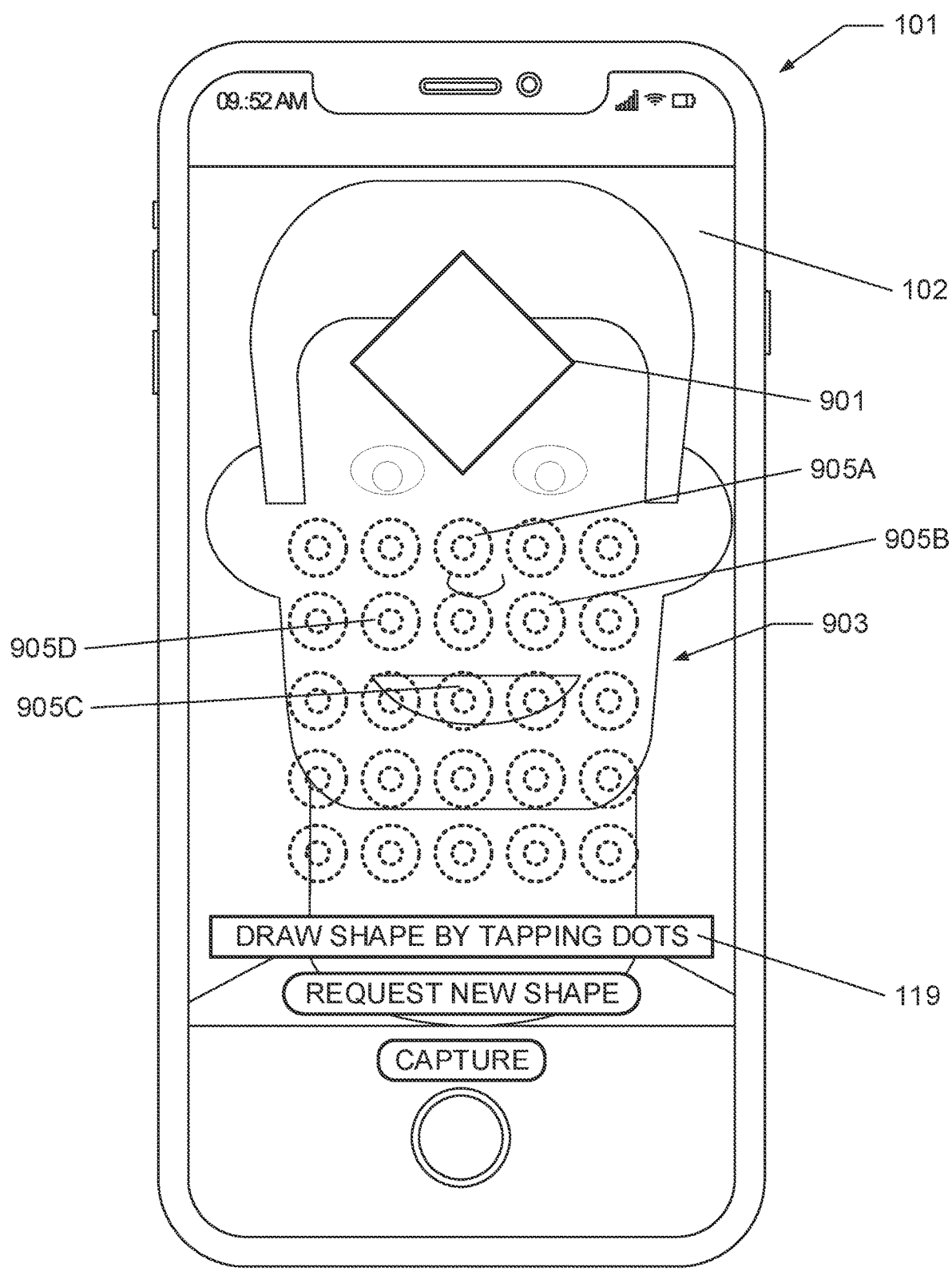
FIG. 9 shows an exemplary computing device and user interface, according to one embodiment of the present disclosure.

FIG. 9 shows an exemplary computing device 101 and user interface 102. The shape service 203 can generate a liveness challenge that prompts a subject to select one or more tracing elements in a pattern that corresponds to a particular shape rendered on the user interface 102. The shape service 203 can render, on the user interface 102, a particular shape 901. The shape service 203 can render, on the user interface 102, a tracing interface 903. The tracing interface 903 can include a plurality of selectable tracing elements that each embody a tracing input upon selection via a user input (e.g., the shape service 203 interprets selection of a tracing element as a tracing input, or portion thereof). For example, the tracing interface 903 includes rows and columns of selectable dots.

The shape service 203 can render, on the user interface 102, an instruction 119 that prompts a user to "draw shape by tapping dots," thereby instructing the subject to select one or more tracing elements of the tracing interface 903 in a pattern corresponding to the particular shape 901. In one example, the particular shape 901 is a square shape in a particular orientation. The shape service 203 can receive one or more tracing inputs that include a selection of tracing elements 905A, 905B, 905C, 905D. The shape service 203 can generate a pattern or shape based on determining an arrangement of the tracing elements 905A, 905B, 905C, 905D in the tracing interface 903. The matching service 205 can perform liveness verification, at least in part, by comparing the pattern or shape the particular shape 901.

Figure 10:
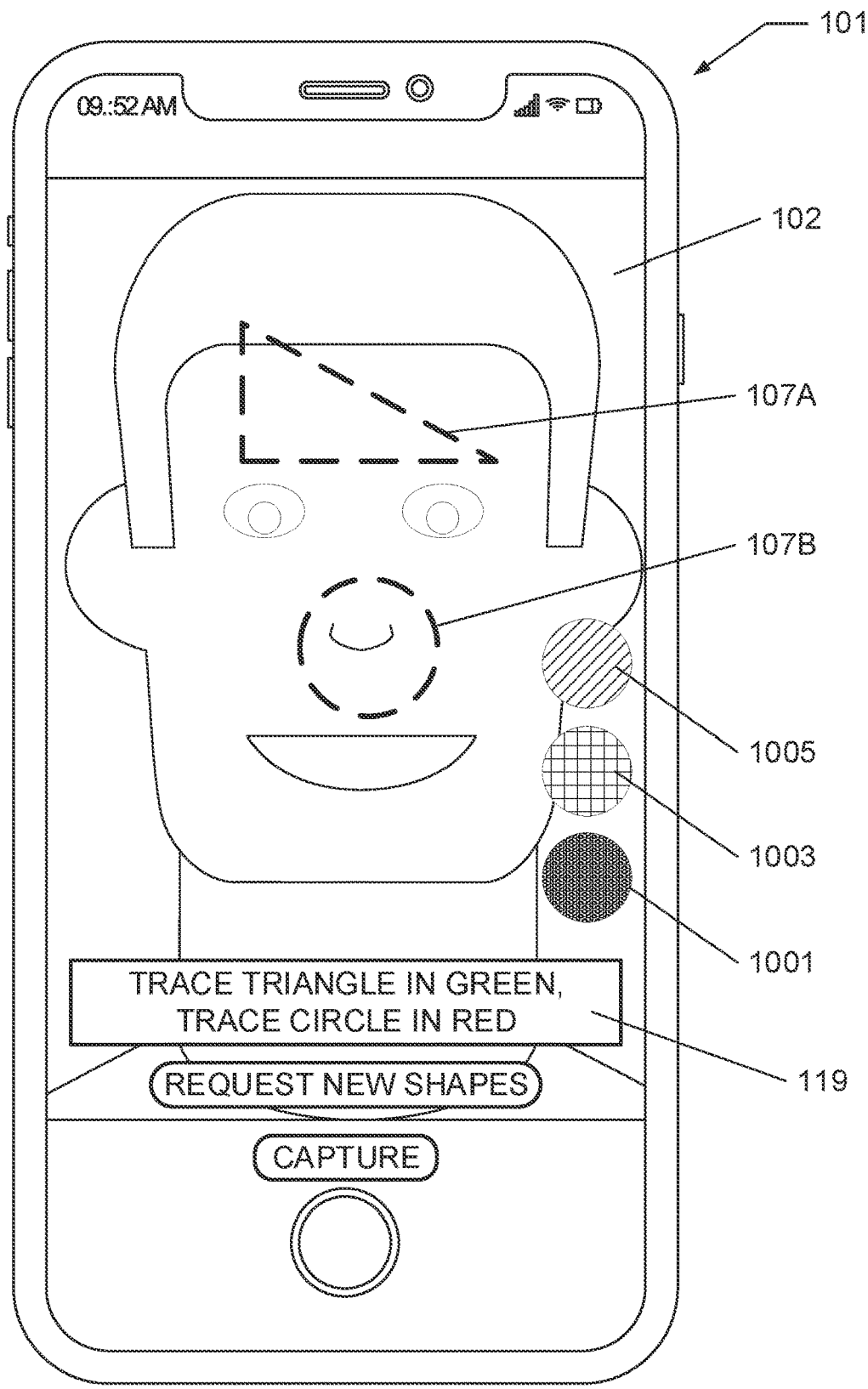
FIG. 10 shows an exemplary computing device and user interface, according to one embodiment of the present disclosure.

FIG. 10 shows an exemplary computing device 101 and user interface 102. The shape service 203 can generate a liveness challenge that prompts a subject to trace one or more shape overlays in a particular color, line pattern, line thickness, order, or combinations thereof.

As shown in FIG. 10, the shape service 203 can render a user interface 102 including a first shape overlay 107A and a second shape overlay 107B. The shape service 203 can render, on the user interface 102, selectable elements 1001,

1003, 1005. In response to receiving a selection of a selectable element, shape service 203, or application 211, can assign subsequent tracing inputs to a color (e.g., or other property) corresponding to the selected element. For example, the selectable element 1001 can be associated with a blue color, the selectable element 1003 can be associated with a red color, and the selectable element 1005 can be associated with a green color. The shape service 203 can render, on the user interface 102, an instruction 119 that prompts the subject to trace the shape overlay 107A in a first color and the shape overlay 107B in a second color. For example, instruction 119 prompts the subject to trace the first shape overlay 107A in a green color (e.g., by selecting the selectable element 1005 and providing a first tracing input) and trace the second shape 107B in a red color (e.g., by selecting the selectable element 1003 and providing a second tracing input). The matching service 205 can perform liveness verification, in part, by determining that tracing inputs are associated with one or more predetermined properties, such as particular colors, patterns, line thicknesses, etc. For example, in addition to comparing the first tracing input to the shape overlay 107A and the second tracing input to the shape overlay 107B, the matching service 205 can perform liveness verification by determining that the first tracing input is associated with the green color and the second tracing input is associated with the red color.

Aspects, features, and benefits of the systems, methods, processes, formulations, apparatuses, and products discussed herein will become apparent from the information disclosed in the exhibits and the other applications as incorporated by reference. Variations and modifications to the disclosed systems and methods may be effected without departing from the spirit and scope of the novel concepts of the disclosure.

It will, nevertheless, be understood that no limitation of the scope of the disclosure is intended by the information disclosed in the exhibits or the applications incorporated by reference; any alterations and further modifications of the described or illustrated embodiments, and any further applications of the principles of the disclosure as illustrated therein are contemplated as would normally occur to one skilled in the art to which the disclosure relates.

The foregoing description of the exemplary embodiments has been presented only for the purposes of illustration and description and is not intended to be exhaustive or to limit the inventions to the precise forms disclosed. Many modifications and variations are possible in light of the above teaching.

The embodiments were chosen and described in order to explain the principles of the inventions and their practical application so as to enable others skilled in the art to utilize the inventions and various embodiments and with various modifications as are suited to the particular use contemplated. Alternative embodiments will become apparent to those skilled in the art to which the present inventions pertain without departing from their spirit and scope. Accordingly, the scope of the present inventions is defined by the appended claims rather than the foregoing description and the exemplary embodiments described therein.

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable non-volatile memories such as secure digital (SD), flash memory, memory stick, etc., or any other medium which can be used to carry or store computer program code in the form of computer-executable instructions or data structures and which can be accessed by a computer.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a computer to perform one specific function or a group of functions.

Those skilled in the art will understand the features and aspects of a suitable computing environment in which aspects of the disclosure may be implemented. Although not required, some of the embodiments of the claimed inventions may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed invention are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the inventions are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the invention is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed inventions will be readily discernible from the description herein, by those of ordinary skill in the art. Many embodiments and adaptations of the disclosure and claimed inventions other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed inventions. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed inventions. In addition, some steps may be carried out simultaneously, contemporaneously, or in synchronization with other steps.

The embodiments were chosen and described in order to explain the principles of the claimed inventions and their practical application so as to enable others skilled in the art to utilize the inventions and various embodiments and with various modifications as are suited to the particular use contemplated. Alternative embodiments will become apparent to those skilled in the art to which the claimed inventions pertain without departing from their spirit and scope. Accordingly, the scope of the claimed inventions is defined by the appended claims rather than the foregoing description and the exemplary embodiments described therein.

What is claimed is:

1. A method, comprising:
   capturing biometric data of a subject via at least one computing device;
   rendering, on a display of the at least one computing device, at least two shape overlays and an instruction to:
   trace a first shape overlay of the at least two shape overlays in a first color; and
   trace a second shape overlay of the at least two shape overlays in a second color different from the first color;
   during capture of the biometric data, receiving, via the at least one computing device, a tracing input corresponding to the at least two shape overlays, wherein the tracing input comprises a first tracing input for the first shape overlay and a second tracing input for the second shape overlay;
   determining that the first tracing input is associated with the first color and the second tracing input is associated with the second color;
   receiving the biometric data from the at least one computing device;
   comparing the tracing input and the at least two shape overlays; and
   based on the comparison, determining that the biometric data satisfies at least one liveness threshold.

2. The method of claim 1, further comprising generating at least one fixed-size representation of the subject based on the biometric data.

3. The method of claim 2, wherein the biometric data comprises a facial scan of the subject.

4. The method of claim 3, wherein the facial scan comprises a video.

5. The method of claim 1, wherein:
   the first shape overlay of the at least two shape overlays is a first shape; and
   the second shape overlay of the at least two shape overlays is a second shape different from the first shape.

6. The method of claim 1, further comprising rendering, on the display, a plurality of color selectors comprising at least the first color and the second color.

7. The method of claim 1, wherein at least one shape overlay of the at least two shape overlays comprises a closed shape.

8. The method of claim 1, wherein at least one shape overlay of the at least two shape overlaps comprises an open shape.

9. A system, comprising:
a server having a processor operatively configured to:
receive captured biometric data of a subject from at least one computing device;
output instructions for rendering, on a display of the at least one computing device, at least two shape overlays and an instruction to:
trace a first shape overlay of the at least two shape overlays in a first color; and
trace a second shape overlay of the at least two shape overlays in a second color different from the first color;
receive biometric data and tracing input data from the at least one computing device, the tracing input data being indicative of a tracing input received by the at least one computing device simultaneously with the at least one computing device capturing the biometric data, and the tracing input data further corresponding to the at least two shape overlays, wherein the tracing input data comprises a first tracing input for the first shape overlay and a second tracing input for the second shape overlay;
determine that the first tracing input is associated with the first color and the second tracing input is associated with the second color;
compare the tracing input data and the at least two shape overlays; and
based on the comparison, determine that the biometric data satisfies at least one liveness threshold.

10. The system of claim 9, further comprising at least one data store configured to store a plurality of shape overlays, wherein the processor is configured to retrieve the at least two shape overlays from the plurality of shape overlays.

11. The system of claim 9, wherein the processor is configured to pseudorandomly generate the at least two shape overlays based on a seed value.

12. The system of claim 9, further comprising at least one data store configured to store at least one policy corresponding to the at least one computing device, wherein the processor is configured to render the at least two shape overlays on the display based on the at least one policy.

13. The system of claim 12, wherein the at least one policy comprises causes the processor to render the at least two shape overlays within a particular region of the display.

14. A non-transitory, computer-readable medium comprising instructions that, when executed by a computer, cause the computer to:
capture biometric data of a subject via at least one secondary computing device;
render, on a display of the at least one secondary computing device, at least one shape overlay;
render a particular shape on the display;
during capture of the biometric data, receive, via the at least one secondary computing device, a tracing input of the at least one shape overlay, wherein the tracing input comprises an erasure of a portion of the particular shape and a non-erased portion of the particular shape;
receive the biometric data from the at least one secondary computing device;
compare the tracing input and the at least one shape overlay by comparing the non-erased portion of the particular shape to the at least one shape overlay; and
based on the comparison, determine that the biometric data satisfies at least one liveness threshold.

15. The non-transitory, computer-readable medium of claim 14, wherein the instructions, when executed by the computer, further cause the computer to:
generate at least one fixed-size representation (FXR) of the subject based on the biometric data;
compare the at least one FXR to at least one secondary FXR associated with a second subject; and
based on the comparison of the at least one FXR to the at least one secondary FXR, positively verify that the subject and the second subject share an identity.

16. The non-transitory, computer-readable medium of claim 15, wherein the instructions, when executed by the computer, further cause the computer to, authorize access for the at least one secondary computing device access to a particular digital environment in response to positively verifying that the subject and the second subject share the identity.

17. The non-transitory, computer-readable medium of claim 15, wherein the instructions, when executed by the computer, further cause the computer to, in response to positively verifying that the subject and the second subject share the identity:
decrypt at least one encrypted communication; and
render the at least one encrypted communication on the display of the at least one secondary computing device.

* * * * *